(12) United States Patent
Dluhos et al.

(10) Patent No.: US 10,139,779 B2
(45) Date of Patent: Nov. 27, 2018

(54) IMAGE RECOGNITION USING HOLOGRAMS OF SPECTRAL CHARACTERISTICS THEREOF

(71) Applicants: Eric John Dluhos, Mifflinburg, PA (US); Bradley Lloyd Wilk, Rhinebeck, NY (US)

(72) Inventors: Eric John Dluhos, Mifflinburg, PA (US); Bradley Lloyd Wilk, Rhinebeck, NY (US)

( * ) Notice: Subject to any disclaimer, the term of this patent is extended or adjusted under 35 U.S.C. 154(b) by 0 days.

(21) Appl. No.: 15/254,266

(22) Filed: Sep. 1, 2016

(65) Prior Publication Data

US 2016/0370761 A1 Dec. 22, 2016

Related U.S. Application Data

(63) Continuation of application No. 13/987,505, filed on Jul. 15, 2013, now Pat. No. 9,442,459, which is a continuation-in-part of application No. 13/987,337, filed on Jul. 13, 2013, now abandoned.

(60) Provisional application No. 61/741,160, filed on Jul. 13, 2012.

(51) Int. Cl.
*G03H 1/00* (2006.01)
*G03H 1/04* (2006.01)
*G03H 1/22* (2006.01)
*G03H 1/02* (2006.01)

(52) U.S. Cl.
CPC ............ *G03H 1/0005* (2013.01); *G03H 1/04* (2013.01); *G03H 1/0443* (2013.01); *G03H 1/2286* (2013.01); *G03H 2001/0072* (2013.01); *G03H 2001/0204* (2013.01); *G03H 2001/0454* (2013.01); *G03H 2001/2292* (2013.01); *G03H 2222/23* (2013.01)

(58) Field of Classification Search
CPC ...... G03H 1/2294; G03H 1/08; G03H 1/0005; G03H 2001/0224; G03H 1/22; G03H 2001/0816; G03H 1/0841; G03H 1/0402; G03H 1/041; G03H 2226/02; G03H 2001/2244; G03H 2001/0038; G03H 2001/2255; G03H 2225/30; G02F 2203/12
USPC .................. 359/9, 10, 11, 21, 24, 29, 32, 35
See application file for complete search history.

(56) References Cited

U.S. PATENT DOCUMENTS

2004/0179738 A1* 9/2004 Dai ...................... G06T 7/0002
382/218

* cited by examiner

*Primary Examiner* — Jade R Chwasz
(74) *Attorney, Agent, or Firm* — Gary Baker; BioPatent

(57) ABSTRACT

The present invention generally extends to methods, systems, and devices that advantageously employ holograms to store and retrieve information about objects, and to compare objects. Methods include generating first and second holograms of image spectral cross sections comparing the holograms and using a photometer to analyze the comparison result. Computer program products are described for use in differentiating spectral components of spatial cross sections of image pixels.

12 Claims, 24 Drawing Sheets

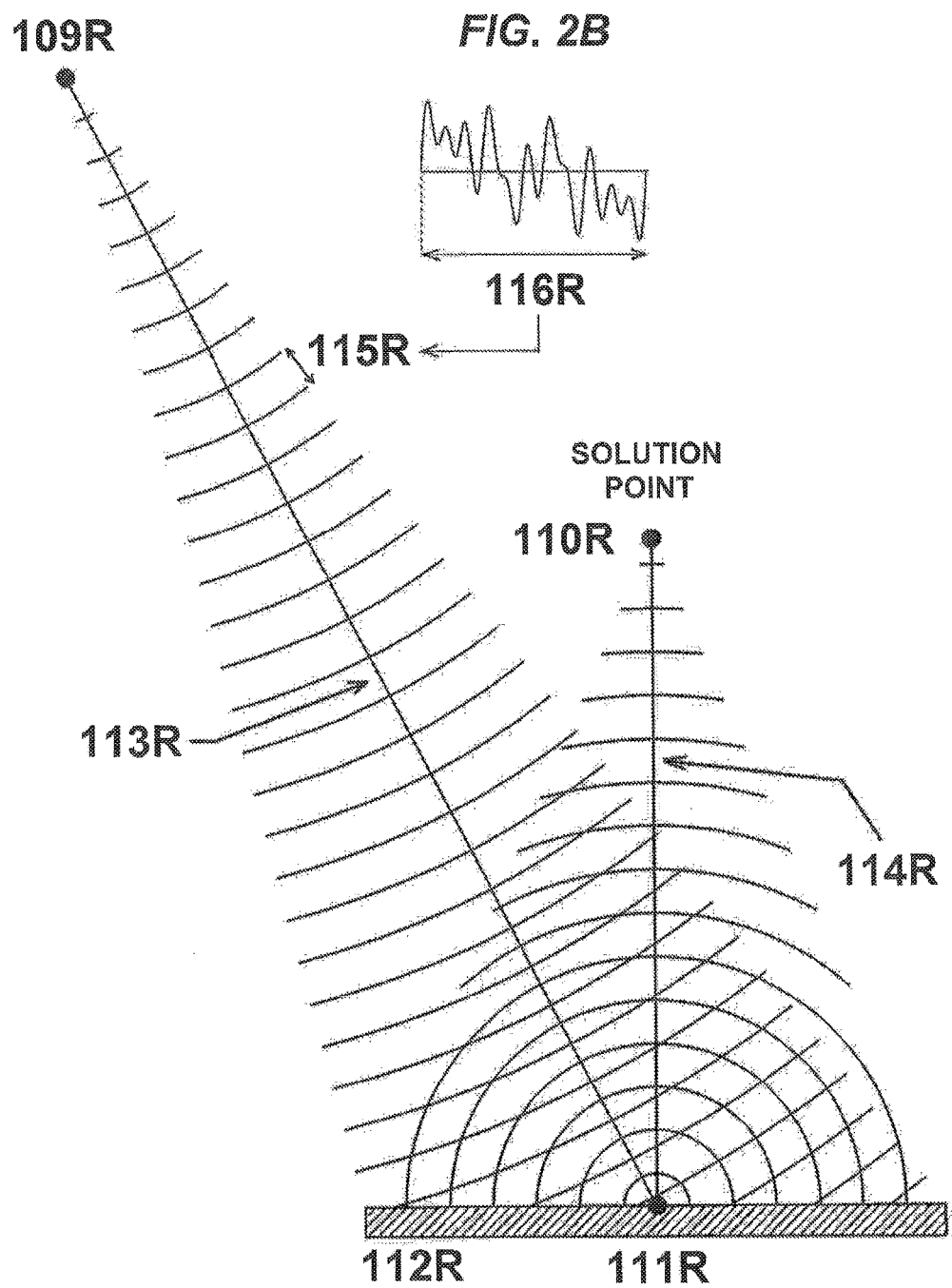

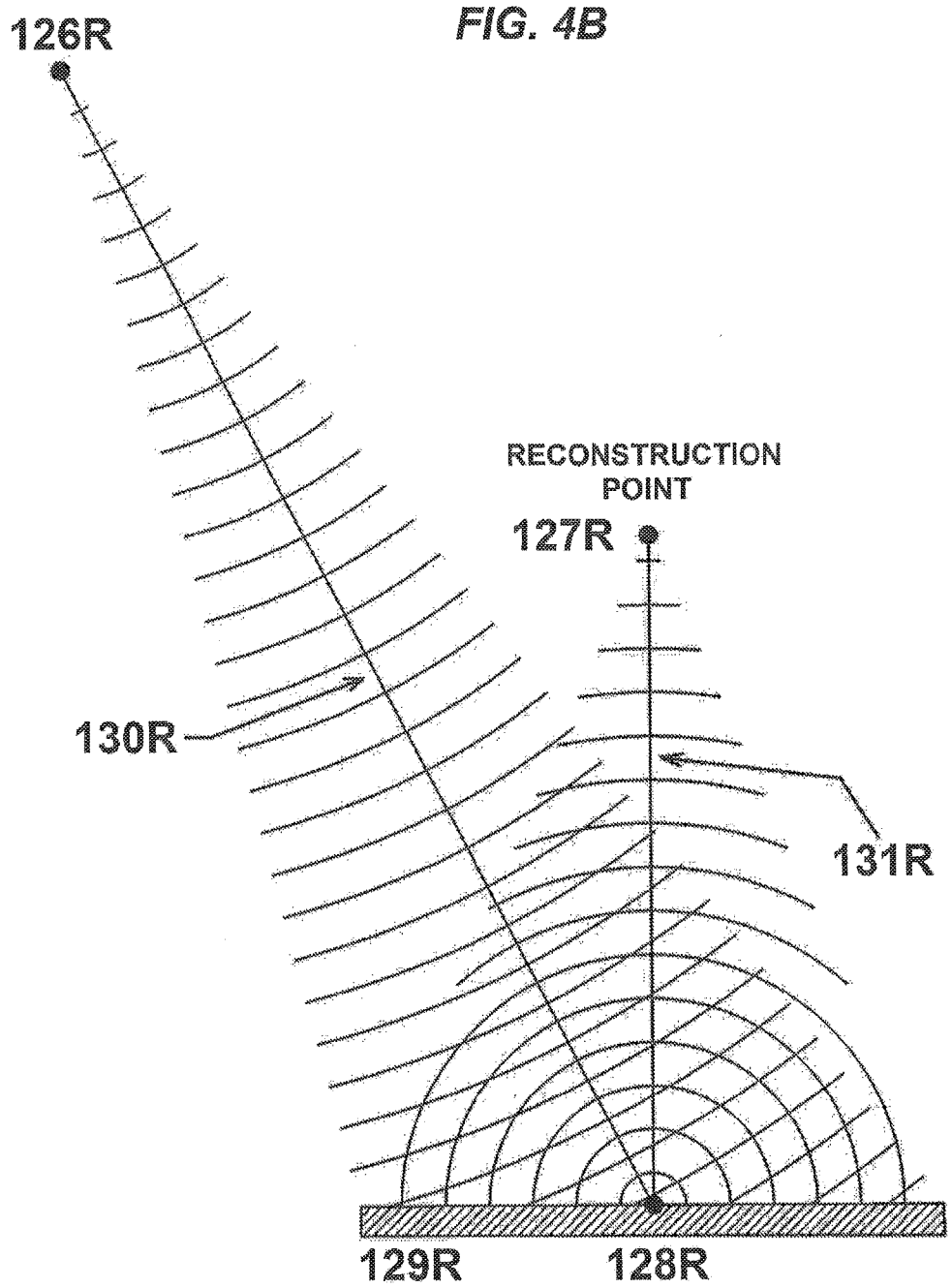

AMP. SAMPLE = PTT_ARRAY(A);
WHERE:
A = INT(B * C / D);
A = AMPLITUDE LOOK-UP INDEX;
B = TOTAL SAMPLES IN ARRAY;
C = PHASE COMPONENT;
D = CARRIER WAVELENGTH

IMAGE RECOGNITION USING HOLOGRAMS OF SPECTRAL CHARACTERISTICS THEREOF

CROSS-REFERENCE TO RELATED APPLICATIONS

This application is a continuation of U.S. patent application Ser. No. 13/987,505 entitled MAKING HOLOGRAPHIC DATA OF COMPLEX WAVEFORMS and filed Jul. 15, 2013, which also claims priority to and the benefit of U.S. Provisional Application 61/741,160 filed Jul. 3, 2012. In addition, the above noted U.S. patent application Ser. No. 13/987,505 is a continuation-in-part of U.S. application Ser. No. 13/987,337 filed on Jul. 13, 2013, to which the present application claims benefit and priority. The content of the above noted priority disclosures are incorporated herein by reference as if fully set forth herein.

BACKGROUND

There is a branch of holography known as recognition holography to those skilled in the art. Recognition holography is a technique where physical objects are holographically recorded as a reference archetype for subsequent comparisons to secondary objects having varying degrees of similarity with the original. Here, the hologram ultimately serves as a discriminator—a recognizer—that helps detect this degree of similarity. The process requires that the secondary objects to be compared with the primary original are placed in proximate physical position where the original object existed with respect to the holographic recording medium at the time of recording. The comparison object is then illuminated with the same reference beam or one with nearly identical properties such as wavelength and physical positioning as the original one. These rays interact with the secondary object and subsequently interact also with the hologram. If the secondary object is similar to the primary, its complex wavefront will also be similar and the hologram will filter these rays accordingly in proportion to that degree of similarity. A lens is sometimes also used to concentrate the diffracted rays filtered by the hologram into a focal point where they may be practically measured by a transducer such as a photosensor. The lens can also be included in the original recording setup which can eliminate the need to include one later as the hologram reproduces the effects of the original wavefront which included the lens. The photosensor can be connected to additional circuitry, which monitors the recognition process electronically and/or automatically.

The general field of Holography dates to back to 1947 when British physicist Dr. Dennis Gabor first coined the term "hologram", which literally translated means the whole picture. The core concept and phenomenon behind a hologram's namesake is due to its unique property whereby the entire whole of an object's visual presence image is captured in every single recording pixel of the hologram, itself, sometimes referred to as an interference pattern or holographic recording. Though it requires a certain number of such pixels to be able to reconstruct a holistic image of the object to a suitable level of clarity, the scientifically fascinating point of this holistic property is that a hologram can be greatly damaged or destroyed, and yet the entire image will reconstruct in real and virtual space when re-illuminated by the proper radiation source. When we say the "illuminated" we do not merely refer to visible light as the radiation source, as a hologram can be constructed using any type of electromagnetic or other physical vibrations, including sound waves. However, the essential requirement for recording a hologram is that the source of radiation used is coherent; that is, it contains rays that are synchronized phase-wise in lock step fashion to each other.

While there are slight variations in holographic recording techniques using coherent radiation sources other than visible light or ultra-violet or infra-red lasers, the conventional recording process for making a hologram is generally carried out in most cases as follows:

The source rays are split into two beams usually by means of a beam splitter and subsequently are expanded by lenses, generally. One of these beams—the object beam—is the portion of the source, which bombards the object. These bombarding rays interact with the object such that they are either reflected or transmitted by it toward a recording medium—usually a high-resolution plate or film—which captures them. Simultaneously, the second beam—the reference beam—is directed in an unadulterated fashion toward the recording medium itself. These two beams, also known as wavefronts, interact with each other so as to generate microscopic interference fringes upon the surface or within the entire volume of the recording medium material. These fringes are sometimes referred to as Fraunhoffer lines, Newton's Rings and/or Moire patterns, amongst others names. In laymen's terms they appear as complex patterns which look like "ripples on a pond." More accurately they are complex superpositions of Fresnel patterns, and take on the similar pattern of the classic Fresnel lenses seen in the classic lighthouses towers of yesteryear. Although the principle of bending rays by the underlying mathematics of the hologram and the Fresnel lens is basically the same concept in both cases, the hologram performs the bending by means of diffraction and the lighthouse does it by means of refraction. When the recording material is processed it is re-illuminated with the reference beam, the fringe patterns interact with the radiation so as to reconstitute the complex wavefront that existed at the time of the recording.

Thus, even though the original object has been removed—usually—from the recording environment, it's virtual presence is reconstructed back: into physical space where it may be viewed.

The experience of viewing a true hologram generated by this process is not fairly comparable to the highly limited experience associated with traditional stereographic processes—also known as "3D" and sometimes hyped as a misnomer to be holograms. Instead, it is more akin to looking through a window into a world where the object seems to be actually there. That the object is actually there is also not very far from the truth for the very reason that a genuine hologram focuses rays to generate a real image in actual space as well as a virtual image.

Since 1967, experiments in computer generated holography (CGH), also known as digital holography have been carried out. The technique involves making holograms by pure mathematical calculation using computers rather than by the interaction of physical rays. These artificially generated holograms are subsequently printed or reduced photographically onto high-resolution film, plates or other recording material so that they can be viewed and experienced like conventional holograms made by more physical recording apparatus.

Both conventional holography and CGH, or digital holography, normally rely on the use of virtual coherent beams of monochromatic radiation. Occasionally, fun color holograms are made where Red, Green and Blue lasers are used either sequentially or simultaneously.

The automation and robotics industries, which are practical applied branches of the scientific artificial intelligence (A.I.) community, altogether suffer from a deplorable lack of versatility when it comes to the growing needs of industry to be able to faithfully recognize complex, sensory based information, which include audio and visual based patterns amongst others. Moreover, in situations where said complex patterns need to be analyzed quickly and reliably "on the fly," the state of the art research and design process has historically been one which hypes functional expectations of versatility at the outset, and yet because of the unrealized complexity involved in combining the typically requisite smorgasbord of convoluted approaches involved, finally reduces itself towards the development of systems which, to the contrary, eliminate the range of complexity and sophistication of patterns to be recognized from the application. The modern trend is the reductionist approach: to pick the most simple and reliable way to get the job done even if this involves convoluted shortcuts that lack for versatility.

Within this negative trend of shortcut-type approaches, the marketplace introduced a recent plethora of devices each of which is dependent upon bombarding a person with infrared radiation—shining it directly into their eyes no less. Patterns in the illumination are photographed and subsequently analyzed to produce three dimensional information about the subject or subjects. Other companies also are currently producing shortcut-approach devices similar to Kinect, aimed at gesture recognition using similar ray-projection technology. Such systems are altogether doomed to fail absolutely in anything but clean and tight living room or laboratory-style environments. Moreover, such devices do not work in direct sunlight.

Some shortcut approaches in this field also take into reductionist or isolationist account the oversimplified concept of a foreground and/or a background. To those skilled in this art, the terms foreground and background are objectively non-entangled elements that can ultimately be separated perfectly into entities distinct from one other. The reality is that the two concepts are completely subjective and narrowing to true progress in the field. It should be a foregone conclusion that foregrounds and backgrounds are not objectively capturable within the small components'the pixels—but are purely subjective and relativistic terms. Many have tried to differentiate foregrounds from backgrounds. In the prior art, such uses of differentiation yield limited results based only on a narrowly applied what-you-see-is-what-you-get (WYSIWYG) type pixel-for-pixel basis. Such instances include inventions involving traveling matte photography, and also the differential analysis of audio or video by comparing pixels or sound bits acquired most artificially and superficially as two separate instances of acquisition to provide the separation: first an element combined with a background, and secondly the actual background itself.

Rather, the general modern understanding of the underlying processes of biological visual and hearing systems would have it that foregrounds, backgrounds and all other objects of distinguishment are elements purely subjective/subjectively important to the observer.

While in recent years it has become more understood to the more disciplined of the scientific minds within this particular community of discourse that to get to the level of reality that enables a system to be able to distinguish real world higher dimensional objects from one another given mere one-dimensional sound bits or two-dimensional arrays of pixels—to perform the process by artificial computational means—one must have some type of better effective model that actually mimics a biological brain and creates the internal reality of it. However, to date no one has provided an adequate model that explains the complex functions of the central and peripheral nervous systems with any absolutely reliable degree of accuracy or confidence in generating an artificial analog to these that actually works with any high order degree of real-world complexity beyond the laboratory style environments. There have been isolated theories by biologists and physicists that the human mind operates in some manner like a hologram, or is holographic, per se. There are also isolated theories by metaphysicists, which run effectively parallel to this thinking that the biological brain somehow works using vibrational interpretation. Nevertheless, the suitable analog or analogs for practical artificially applied usage have proven to be highly elusive.

Thus, there exists a need for a useful model of a wide range of recognition applications within real world or virtual world environments and scenarios.

BRIEF SUMMARY

Example embodiments described herein provide methods, systems, and apparatuses that advantageously combine the two typically isolated theories of vibrational interpretation and a holographic mind or holographic universe in a practical device and/or methodology.

More specifically, example embodiments use spectral components of specified spatial cross sections of pixels of an image for recognizing a similar image. In such embodiment, holograms of spectral characteristics of one or more spatial cross-sections of pixels of first and second image are generated and compared. Then, using a photometer, the resulting comparison is quantitatively analyzed for determining if a match exists.

The above embodiment may further be enhanced by creating complex waveforms of the spatial cross-sections of the pixels for each image. Each such complex waveform provides a spatial envelope of the changing intensity of the contiguous, spatially situated pixels of the respective one or more cross-sections, which can then be stored for subsequent comparison with other complex waveforms.

In another enhancing embodiment, each of the complex waveforms mentioned above may be normalized by filtering out a DC component therefrom. The DC component may be calculated using, for example: (i) an average intensity of pixels across a respective one or more cross-sections; (ii) an average intensity of pixels across all pixels of each of the one or more cross-sections for a respective image; or (iii) an average intensity of pixels across an entire respective image.

BRIEF DESCRIPTION OF THE DRAWINGS

In order to describe the manner in which the above-recited and other advantageous features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2B is a side view projection of FIG. 2A where the entire coherent wavefront is seen in accordance with example embodiments of the present invention described herein.

FIG. 4B shows a side view projection of FIG. 4A where the entire coherent wavefront is seen according to the prior art;

DETAILED DESCRIPTION

Figure 1A:
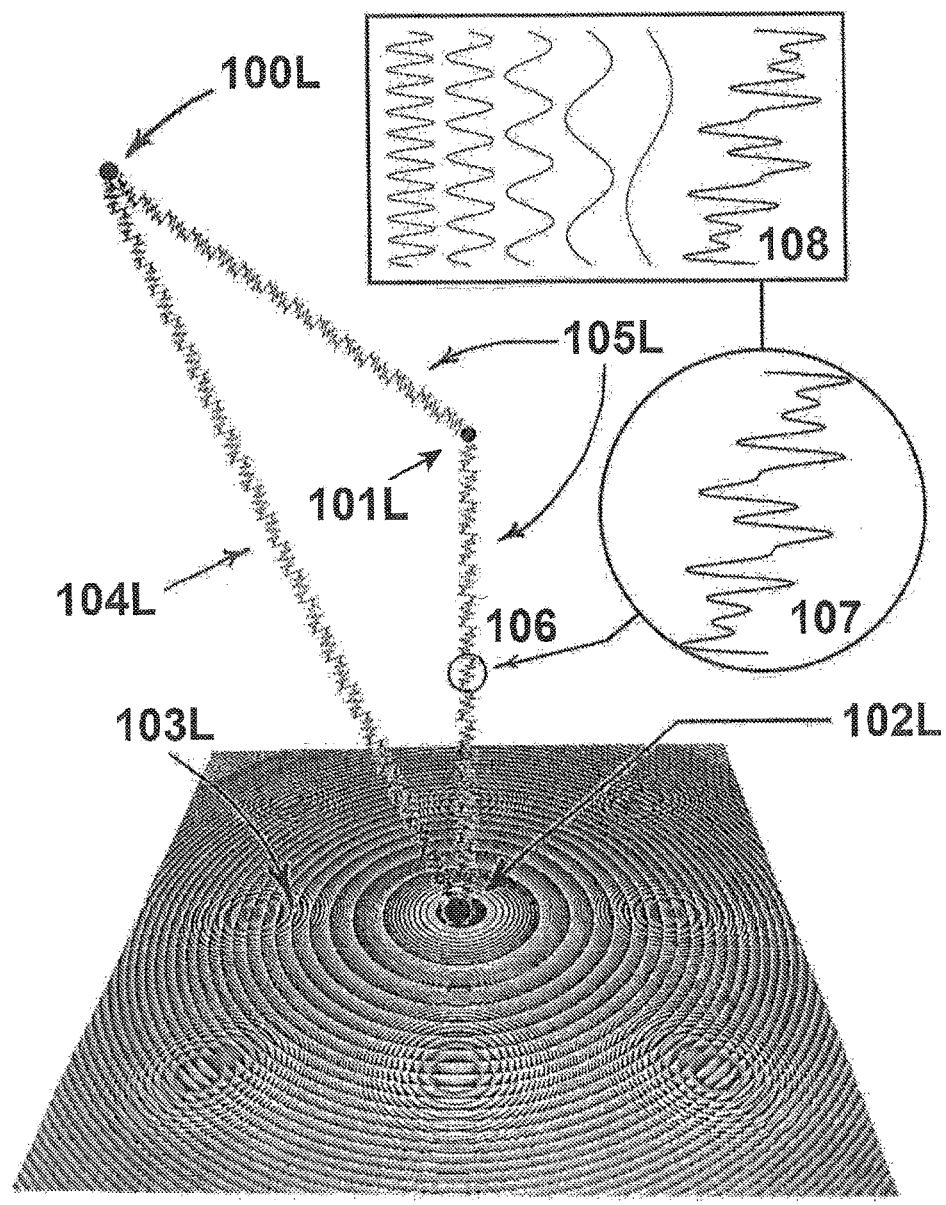
FIG. 1A illustrates holographic recording in accordance with example embodiments of the present invention described herein.

The present invention extends to methods, systems, and devices that advantageously provide for image recognition or differentiation using holograms of spectral characteristics of the images themselves.

More specifically, example embodiments provide for apparatuses, methods, computer program products, and systems that advantageously collect and analyze (e.g., using a Fast Fourier Transform (FFT) analysis) waveforms and other vibrational intelligence and modulates or embeds same into one or more coherent reference beams of an n-dimensional holographic recording, which produces one or more holograms of objects—including singularity points in space. The result of such example embodiments of the present invention provides wholesale differentiation of waveforms distinguishable from others based on their spectral characteristics.

Thus, when holograms are presented with reference beams of vibrational waveforms having substantially similar characteristics to those which were present during recording of the original objects, phantoms of the original objects or subjects will reconstruct themselves in space with an energy glow of intensity that varies thusly with the degree of similarity between the waveform modulations of the reconstructing wavefronts and those of that same which were used to originally record said objects. Said n-dimensional description space can be sampled of the said glowing phantoms. Based on subsequent quantitative analysis of these phantoms, their glowing strengths, positions, structure, layout, groupings and other dynamics about them—which take on a plethora of useful quantitative analysis forms—then pattern recognitions and other information can be achieved about the subjects, subject matters and state of the sensory environment being analyzed.

Historically, there is no known effective technique that provides a wholesale differentiation or recognition of a waveform pattern. By wholesale recognition we mean the elimination of the traditionally convoluted middleware techniques traditionally associated with waveform recognition—one example being traditional spectral analysis techniques as combined with subsequent arcane and sometimes convoluted algorithms and filtering processes.

Example embodiments described herein solve most of the difficulties experienced in the pattern recognition sciences in a novel, speedy and much more elegant manner than in the past. More specifically, example embodiments provide for making holograms of complex waveforms, a technique referred herein as the "HOW" technique (Hologram of Waveform). Whereas conventional physical or digital holography makes holograms of physically or virtually solid objects, respectively, example embodiments essentially freeze a time-based fluctuating state of pure energy—a waveform in and of itself. This is done by inverting certain principles involved in conventional holography, and referred herein as time-icing a waveform. For many applications it is more efficient by orders of magnitude than the traditional Cooley-Tukey algorithm of Fast Fourier Analysis since it permits wholesale differentiation of a waveform as compared with others, as well as the differentiation of spectral components, individually, or combinatorial, en masse.

Many applications of embodiments described herein are envisioned, most notably in the automated recognition of objects, patterns and other various subject matter within visual images, audio streams, and/or other sensory data'among these include applications in gesture recognition.

The primary goal of various embodiments described herein is to differentiate actual waveforms as distinct objective entities or compressed singularities, so as to compare them with other waveforms also like compressed as singularities. Having this ability as a most powerful launch platform, if enough essential information is gathered from sensory intelligence or other vibratory data in the form of waveforms, it is absolutely possible to recognize complex objects, situations and events and other problems by use of the invention. Simply put, this is done by intelligently sampling the n-dimensional reconstruction space for objects and/or singularities and testing their phantom-glow strengths or even the average centroids of these strengths. This intelligent sampling can involve clusters, hierarchies, trees, pathways and the like, of objects or singularities. Many known data processing algorithms can also be applied in such ventures using embodiments described herein; and thus, many methodologies and internal applications are considered herein and are all within the spirit and scope of the present invention.

The present invention may be described in terms of one or more methods comprising functional steps and/or non-functional acts. The following flow describes various steps and/or acts that may be performed in practicing the present invention. Usually, functional steps describe embodiments in terms of results that are accomplished, whereas non-functional acts describe more specific actions for achieving a particular result. Although the functional steps and non-functional acts may be described or claimed in a particular order, the present invention is not necessarily limited to any particular ordering or combination of steps and/or acts.

The following flow generally describes embodiments used to differentiate actual waveforms as distinct objective entities or compressed singularities, so as to compare them with other waveforms also like compressed as singularities. First: the source of coherent radiation is likened to that of a carrier wave and is modulated or otherwise embedded with the complex waveform, which waveform is made to repeat itself within every undulation of the fundamental frequency of the coherent source; that is, the waveform repeats at every wavelength. This likens the source wave to a carrier wave and the waveform to a modulating wave, which is the basis of heterodyning in the field of radio communications, Second: the waveform-modulated or waveform-embedded source as described in the First instance above is then split into the conventional two parts used to record holograms, i.e., a reference beam and an object beam. The object beam illuminates one or more objects and the reflection and/or transmission of that wavefront is captured using a recording medium or electronic recording apparatus; for example, a camera or image sensor. The reference beam illuminates or otherwise impinges directly upon the recording medium. The interaction of the two beams at the recording medium generates an interference pattern.

Third: the interference pattern is subsequently illuminated by a source containing a complex waveform with the coherent carrier having generally the same fundamental frequency as the source described in the First instance above, which was used to make the original holographic recording. Recognition of the secondary waveform, in terms of similarity or dissimilarity with respect to the original or primary waveform, can be made by sampling the space at the position where the original object was illuminated with the original object beam. If the secondary waveform is similar to the original, then there will be a greater energy measurement at the said sampling position. If, on the other hand, the secondary waveform is dissimilar to the original then there will be a lesser energy measurement at the said sampling position.

Embodiments within the scope of the present invention also include computer-readable media for carrying or having computer-executable instructions for performing, in whole or in part, one or more of the aforementioned acts and/or steps. Such computer-readable media can be any available media that can be accessed by a general purpose or special purpose computer. By way of example, and not by limitation, such computer-readable media can comprise RAM, ROM, EEPROM, CD-ROM or other optical, magnetic, electromagnetic, holographic or other type of disk storage, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination thereof) to a computer, the computer properly views the connection as a computer-readable medium. Thus, any such connection is properly termed a computer-readable medium. Combinations of the above should also be included within the scope of computer-readable media.

Moreover, embodiments of the present invention contemplate that the various instances described herein may be carried out by means of computer executable instructions executed on a computing device that simulates the recording and reconstruction processes of the described holographic operation involved by the use of pure mathematics such as by the use of dedicated electronic circuitry and/or conventional computing machinery such as an electronic computer system or systems each having one or more electronic processors, memory, one or more secondary storage devices, a stored program which embodies the analysis, and suitable peripherals capable of at least supplying waveforms as input data and suitable peripherals that provide recognition detections as output data. In this embodiment the holographic recording can be a linear, planar, or higher multidimensional virtual surface. It can also be a point cloud. The objects that are illuminated can also be points. A general flow diagram of this embodiment of the invention is provided in the drawings. It should be noted that the algorithm we provide is one example, which achieves the results. As one might recognize, described embodiments conceivably may be duplicated using a variation of techniques known in the field to produce computer generated or digital holograms but with the goal results of recognition purposes centering around our technique of modulating or embedding the source. Therefore, the use of alternate means to achieve these results of generating and reconstructing a hologram where the source beam is embedded with or is modulated by a complex waveform should be considered as being circumscribed within the scope and spirit of this invention.

Alternatively, embodiments described herein may entail a physical process of an electronically, atomically, magnetically, and/or mechanically controllable wave source that produces a repetitive stream of vibrations amounting to a complex waveform containing simultaneously at least a fundamental and a sub-harmonic component, or alternatively at least two sub-harmonic components. The coherent source used can be one or more atomic or subatomic particles controlled by an electromagnetic energy process. It can also be a laser, maser, sound generator/speaker and/or any other electronic or physical source of mechanical or electromagnetic vibrations in which the said source is modulated by an electronic or other physical apparatus so as to include vibrations, which equate for all practical purposes to the repetitive emission of the complex waveform. An electronic mixer and timing apparatus may be included for this purpose in order to control the beam so that the complex waveform is repetitively emitted at each undulation or wavelength interval.

Alternatively to, or in conjunction with, embodiments described above, the complex waveform may be first Fourier analyzed at the outset. The spectral harmonics derived thereby may be then applied to individual coherent beams each having a differing wavelengths but which are appropriately proportionate with respect to the fundamental wavelength of the base coherent carrier vibration source used, where for proportioning purposes the fundamental wavelength of the base coherent carrier relates to the wavelength of the fundamental of the complex waveform itself. That is, the fundamental and odd and even sub-harmonics which are present in the waveform are derived by the said Fourier analysis and are then used to electronically control automatically, e.g., by means of circuitry and switches the corresponding coherent sources of progressively shorter wavelengths, which are relationally proportionate relative to the fundamental wavelength of the base coherent source. Additionally, the Fourier analysis provides an amplitude level for the fundamental and sub-harmonics of the analyzed waveform. These amplitude levels are also used to control the intensity of the respective said sources by means of circuitry and/or switches. In this configuration, the various coherent sources are aligned by means of mirrors or waveguides so that they emit their radiation along the same path.

An alternative physical process described in preceding paragraph may also be achieved using a virtual process by the similar means of using an appropriate algorithm and electronic computing machinery as described in above.

As to the various computer-executable instructions described herein and above, an alternative variation may be used in which instead of one object or point in space being virtually illuminated with the waveform-modulated or waveform-embedded coherent source, numerous objects or points in space are illuminated either at close or sparse proximity to each other. The numerous objects or points used during the recording process are then sampled during the subsequent reconstruction process in similar manner that the one is sampled. The collective samples can then be averaged for their collective intensities and the average intensity obtained thereby can be used as a more accurate detection of similarity or dissimilarity between the primary original waveform and subsequent secondary waveforms being tested for recognition.

In some or all of the embodiments described above and below, numerous holographic recordings may be obtained on or within the same holographic recording medium, as by means of averaged superimposition. In this manner, numerous waveforms may be associated with numerous objects and/or points in space so that a sophisticated network of recognition or quantitative analysis may be achieved within the same hologram where desired.

Further, in some or all of the embodiments described above, the source beam may be optionally moved in order to change the current category of recognition. That is, a series of holographic recordings may be made of numerable waveforms, which belong to a certain category of recognition with the source beam being fixed in any given position. Where additional categories of recognition are desired, each may be recorded in turn by changing the position of the source beam. This additional technique makes it possible to position objects in space for one category of recognition, which share the same collective space with other objects pertaining to another category of recognition. Reiterating, this is an optional variation of the invention and is not necessarily a limitation of the invention or requirement for distinguishing categories of recognition by the use of embodiments described herein.

One main thrust becomes how to gather and provide the waveforms themselves. In this there are also numerous and multifarious approaches that can be used. Generally, it involves the basic concept extracting and/or filtering waveforms from sensory intelligence and other vibrational changes. An audio stream is an audio stream. It may be provided en masse or it may be provided in packets in terms of modulating or embedding the coherent reference beam. As for visual information, the problem becomes vastly more involved. There are numerous ways to do it and they too are all within the spirit and scope of this invention. To list them all would be impossible. Thus it should not be construed as a limitation on the invention to not list them. The bottom line is that any vibrational data, whether sensory or non-sensory, concrete or abstract, can be used by the invention to yield a solution by means of recognition. It is further noted that it may or may not be desirable to first remove the DC component from whatever waveform used prior to its embedding or modulation of the coherent beam used to generate the hologram.

Of particular interest however, there are two distinct categories of waveform intelligence extraction given by way of examples as follows:

EXAMPLE 1

An n-dimensional visual image or motion picture may be broken up into linear or curvilinear or even volumetric-based pixel slices. This pixel slice includes spatial frequencies useful for quantitative analysis. Once obtained, the pixel slice is converted to one or more waveforms and is then applied by the invention to create and/or reconstruct objects or point singularities by way of holograms. In fact, an entire stream of images en masse can be converted to a waveform and used.

EXAMPLE 2

As but one application of many available to it, the instant invention provides a practical means for analyzing one or more collectives of vibrational changes between frame-oriented packets of dynamic sensory information—visual, sonic, tactile etc.—or other vibrational forms of intelligence, which are captured by means of transducers such as sensors. By this it is meant population coding: the taking of populations of vibrations and finding the average centroid. The vibrations are of an n-dimensional nature—X, Y, Z etc. vibrational dimensions—then converted into waveforms and applied holographically in the manner described herein. More specifically, one would extract the waveforms generally as follows:

First: information in one packet of information is differentially compared for changes between one or more adjacent, roughly contiguous, or further-removed neighbors, but which in most cases will be the preceding packet or frame. The term pixel has broad meaning within the scope of this embodiment and does not necessarily imply visual pixels, but rather sub-divisional unitary recording bodies (unitary bodies) of any kind. Roughly speaking, this comparison for change between frames or packets takes place on a one-for-one, pixel-for-pixel basis; however, the supplied unitary bodies presented which may be finite in nature as a given field of pixels or recording elements or memory spaces may be progressively expanded into further and further subdivisions or particles, ad infinitum, as desired. Therefore, the one-for-one comparison is the general rule, but not a limitation. The essence is that the unitary bodies or pixels in the packets or frames being compared to each other differentially have coordinates which correspond to each on a generally one-for-one basis with each other, and this same relationship also applies to the record of the differential analysis achieved, described below.

Second: the pixels or unitary bodies that comprise the informational area or the n-dimensional volume of the said contiguous informational packets which are input and thus being compared, are individually set—or reset if negation is desired—depending on the difference value between them tripping a threshold value, which threshold value is supplied separately and is variable. Thus, if the threshold value is equated or passed by the difference value of the analysis, a switch or flag is set or reset—or the actual difference value itself or a filtered modification of it is stored—within a corresponding unitary body within a third, auxiliary packet which records the results of this differential analysis, and this occurs for each unitary body or pixel being compared within the said packets being compared. In other words, the third auxiliary packet is the differential of the two or more packets, which have been so analyzed. In the invention proper, no name should be given to what this difference can be called beyond the fact that it is some form of dynamic change in and of itself. Altogether, these vibrations acquired are of a collective nature within the meaning of this invention. They are not to be narrowly construed as to which category of vibrations they are. Indeed, they may include entangled combinations of any of the following types: motion difference, color difference, amplitude difference, etc.

Third: subsequent to the differential analysis mentioned above, the auxiliary packet which stores that analysis is scanned as follows: (1) the set unitary bodies or pixels—or reset pixels if negation is desired—are tallied, quantified into a storage element or a counting variable; (2) as these particular pixels are counted, their location coordinates are likewise accumulated into separate storage elements or variables, one dimension being recorded per variable. It is noted here that although the record of change by means of the earlier-described differentiation may exist as the actual complete record of change by means of a complete third packet described, the record of change may alternatively exist in a more condensed format simply as being one or more storage elements or variables; each of which separately records the accumulations of the various n-dimensional coordinates of the unitary bodies or pixels, with each one storage element or variable recording the accumulations of coordinates for a given pixel dimension. In the latter case, along with the coordinate accumulating elements, an additional element or variable is used to record the actual count or tally of those compared unitary bodies or pixels which by reason of comparison tripped the threshold and were set—or reset if negation was desired. However, if the subsequent analysis and conversion of the differentiation which is explained below, rather than being performed separately and subsequent to the above differentiation process, is performed simultaneously with it on the fly.

Fourth: the accumulated populations are averaged by the tally of the counted differentials. The combination of these averaged population elements—coordinates—yields a centroid.

Fifth: each individual centroid coordinate is likened to a charge pressure, or voltage. Each is applied to a filter-charge device such as an R-C capacitive circuit, or an L-C inductive circuit. Also, a selectively controlled transistor or drain resistor, perhaps combined with a transistor or other suitable micro controllable device should be placed across the storage element so that the time constant can be manipulated as if the charge/discharge time stands still, holding the charging and discharging effect within the straight-line portion of the charging curve. The final output pressure or voltage of each individual circuit is then collected by means of an analog-digital converter and are sequenced together as the samples of the waveforms that are to be holographed, individually or collectively. These samples may first be further filtered or integrated by means of an auxiliary apparatus. Alternatively, rather than using actual charging circuits, the dynamic charge equation (capacitor or inductor) can be used. In this case the value of t for time should be held in check as a constant. It should be held generally in the straight-line portion of the charging curve. This value of t can easily be derived based on the value of R with respect to L or C.

Sixth: the process repeats as appropriate so as to continuously obtain samples to produce a waveform.

The horizontal and vertical waveforms of the algorithm described above may also applied to be used as an untethered means of a user being able to move a cursor about a screen by simply making movements in front of a camera. The derived horizontal waveform coordinates themselves, the samples of which taken as X, Y coordinate pairs, become the centroid of the cursor which will move over time in step with the horizontal and vertical waveforms when taken on a sample-by-sample basis. By subsequently analyzing the horizontal and vertical waveforms described using the holographic techniques herein, it is possible to detect various complex gestures as distinguishable from others, including that of click and double-click, for instance.

The detailed description of the drawings will now be made. Note that although the following illustrations may take on specific forms (such as a recording plane, surface, area, or the like) or have a certain waveform (e.g., number of harmonics used), embodiments herein contemplate many different forms or recording, reconstruction, and use of modulated beams therefor. As such, any specific use or form of such is used herein for illustrative purpose only and should not limit or otherwise narrow the scope of the present invention unless otherwise specifically claimed.

FIG. 1A demonstrates the holographic RECORDING process in accordance with example embodiments. As illustrated, element 100L represents a point source of emission of a coherent reference beam ray. It is seen that the fundamental wavelength of this coherent beam is modulated by or embedded with a complex waveform—more clearly shown in the magnified portions 106, 107 and 108. Further, the magnified waveforms in 108 also show that the complex waveform is comprised of harmonics which give rise to the complex waveform's overall characteristics. As shown, the reference beam ray 104L strikes a holographic recording 103L, which in the drawing is a plate at point location 102L. Further, 101L represents an object point in space while 105L demonstrates the reference beam being broken into an object beam. It is given to understand by implication of the drawing that the ray is repeated for all recording points or pixels of the hologram.

Figure 1B:
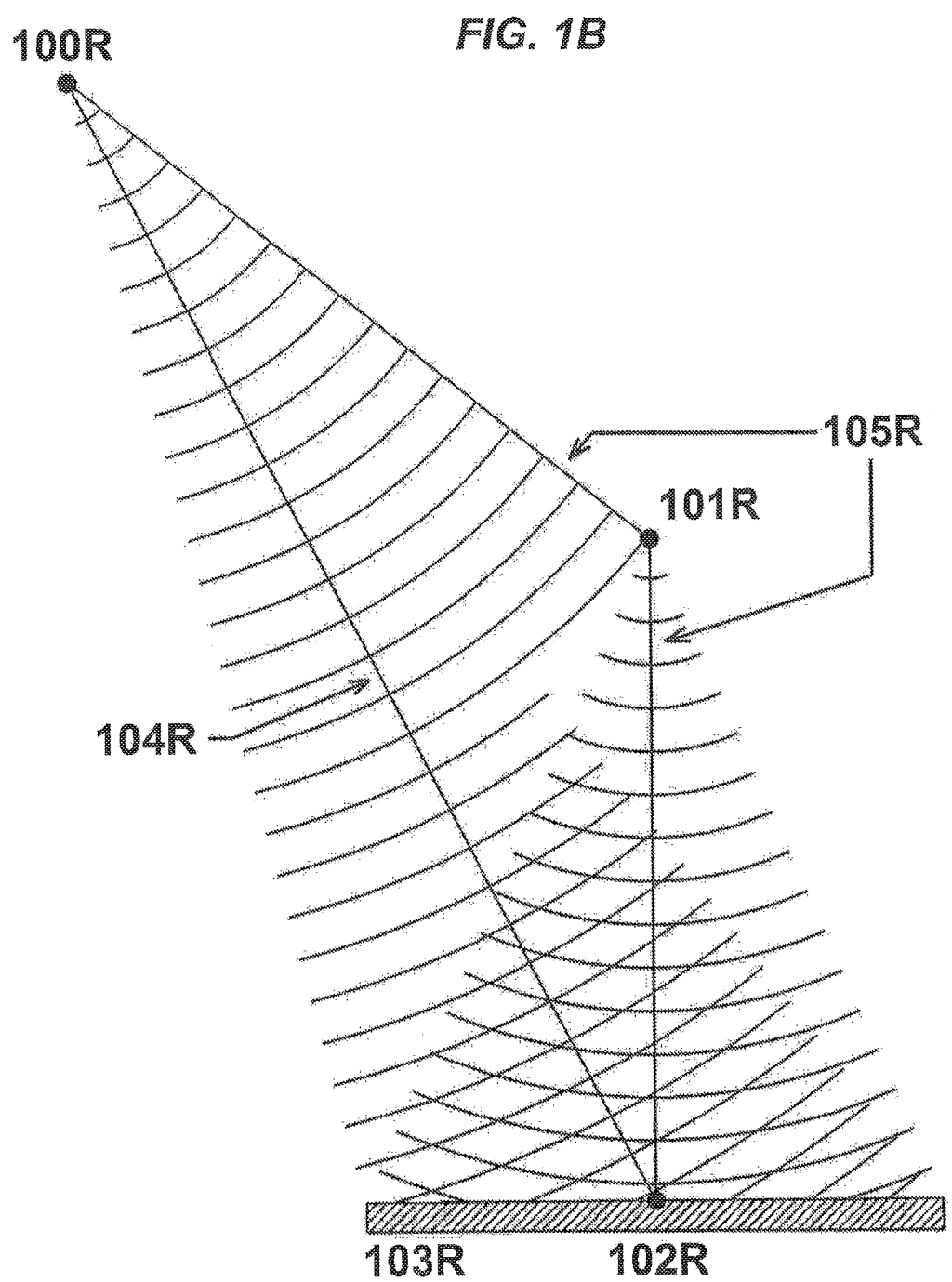
FIG. 1B illustrates is a side view projection of FIG. 1A where the entire coherent wavefront is seen in accordance with example embodiments of the present invention described herein.

FIG. 1B is a side view projection of FIG. 1A and where the entire coherent wavefront is seen. All the R numbers correspond in like kind with the L numbers of FIG. 1A, i.e., with the exception of 106, 107 and 108, which are automatically implied.

Figure 2A:
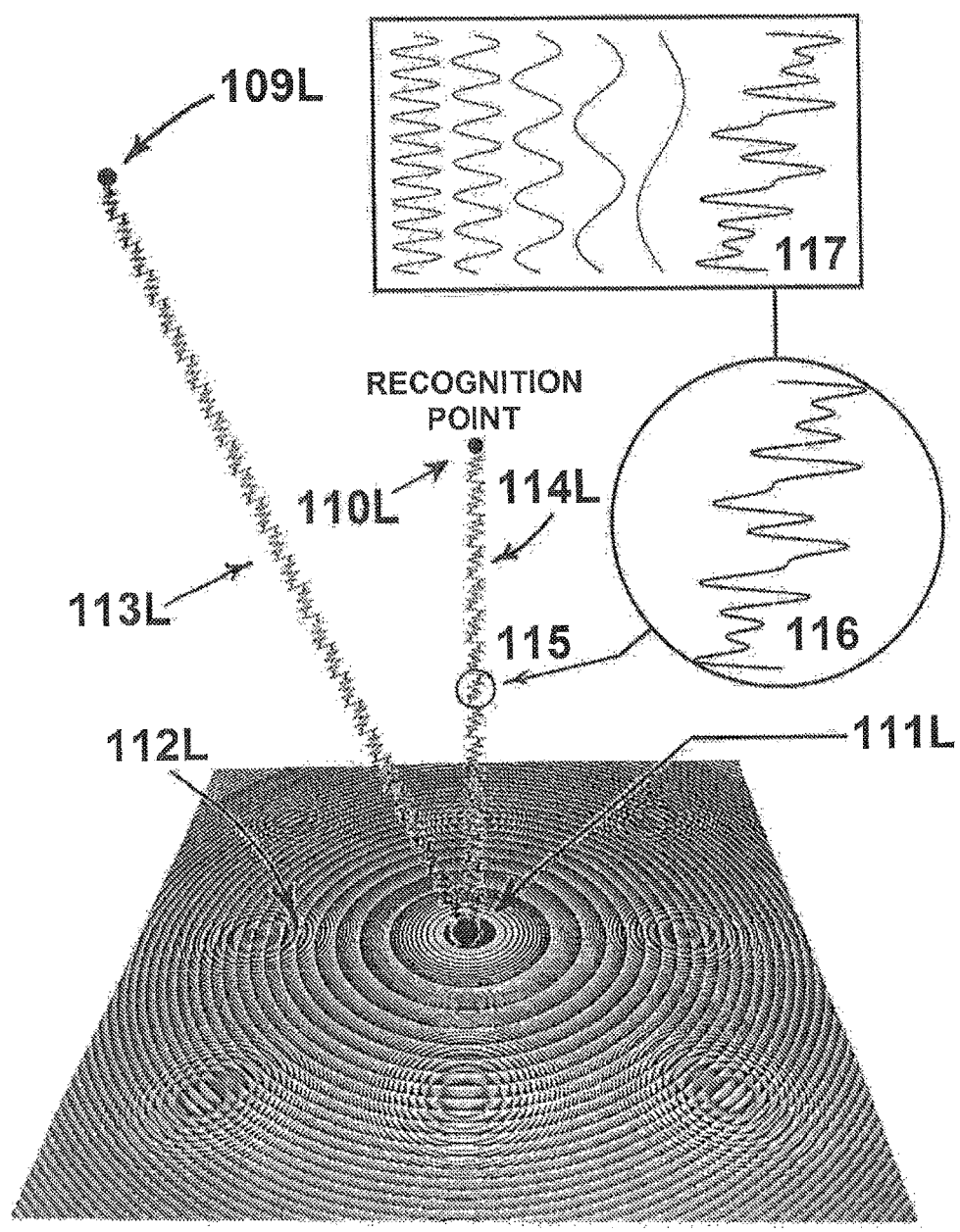
FIG. 2A illustrates holographic reconstruction in accordance with example embodiments of the present invention described herein.

FIG. 2A demonstrates the holographic RECONSTRUCTION in accordance with example embodiments described herein. The drawing corresponds very much to FIG. 1A with one primary exception: the "Recognition Point" 110L is the solution, the original object point reconstructed in space in contrast to FIG. 1A where it was initially recorded. As in FIG. 1A, the same reference beam—modulated or embedded with a complex waveform—is used to perform the reconstruction same as it was used to perform the recording. As shown, 109L is the point source; 113L is the reference beam wavefront; 112L is the holographic recording; 111L is a holographic recording pixel being bombarded for reconstruction in this case; 114L is the reconstructing wavefront after the reference beam is modified by the hologram; and 115, 116 and 117 show the detail of the complex waveform, which is embedded into or modifying the coherent beam.

FIG. 2B is a side view projection of FIG. 2A and where the entire coherent wavefront is seen. All the R numbers correspond in like kind with the L numbers of FIG. 2A, i.e., with the exception of 117, which is automatically implied.

Figure 3A:
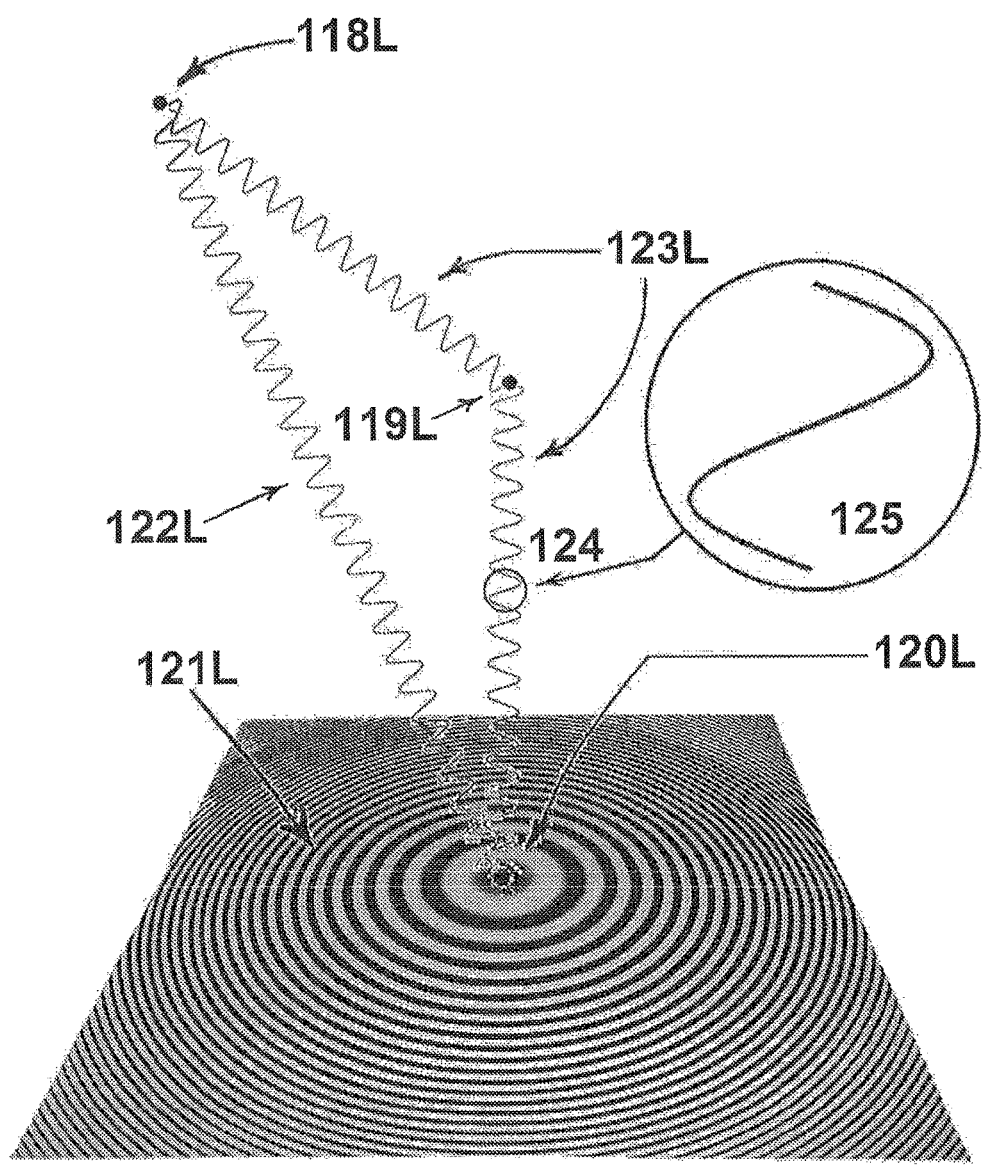
FIG. 3A shows a prior art holographic recording setup similar to FIG. 1A.

FIG. 3A a similar holographic recording setup as given by FIG. 1A; however, FIG. 3A is a representation of the prior art. As clearly shown by 122L, 123L, 124 and 125, the coherent beam is an un-modulated sine wave and 118L represents the point source in space; 121L is the holographic recording; 120L is a recording pixel; and 119L is the object point.

Figure 3B:
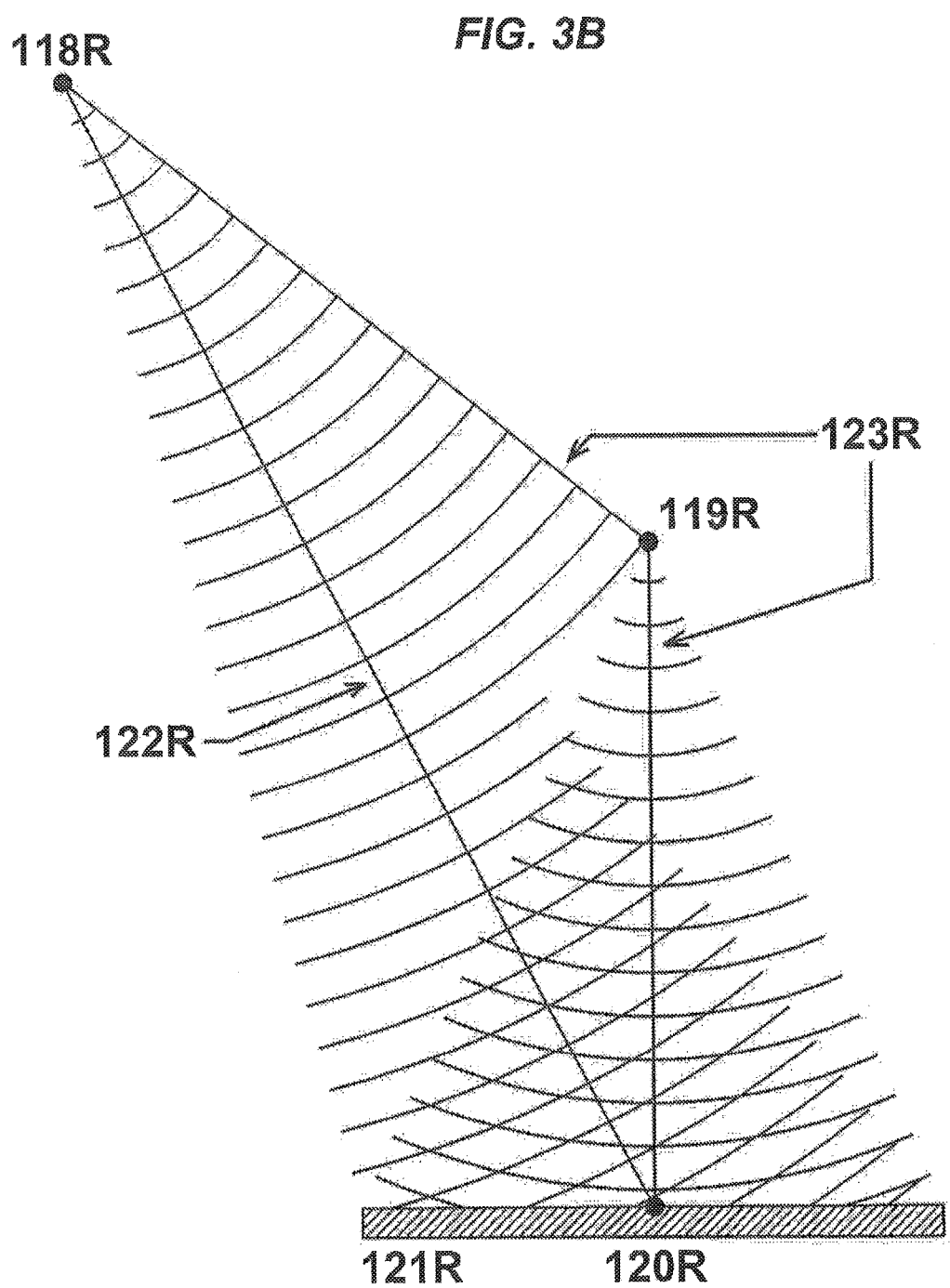
FIG. 3B shows a side view projection of FIG. 3A where the entire coherent wavefront is seen according to the prior art.

FIG. 3B is a side view projection of FIG. 3A and where the entire coherent wavefront is seen. All the R numbers correspond in like kind with the L numbers of FIG. 3A, i.e., with the exception of 124 and 125, which are automatically implied.

Figure 4A:
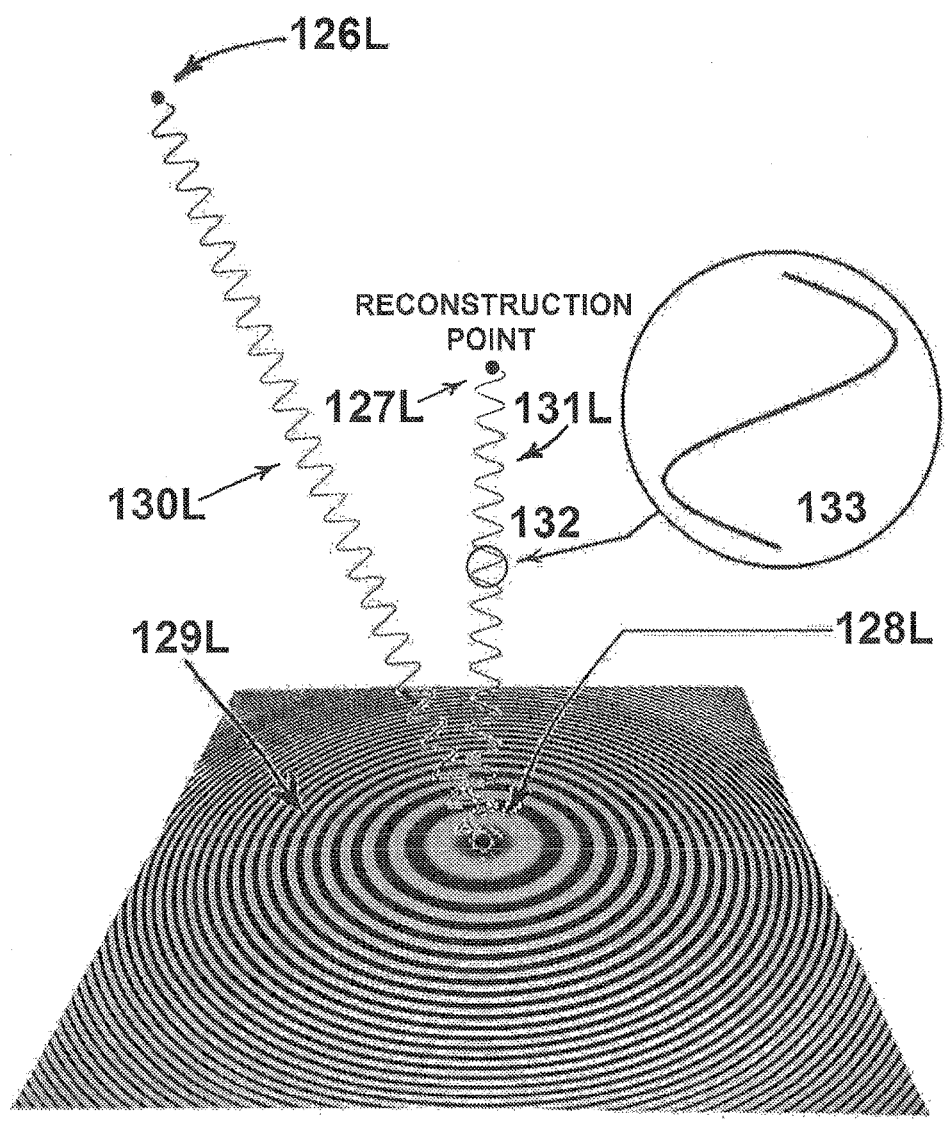
FIG. 4A shows a prior art holographic reconstruction setup similar to FIG. 2A.

FIG. 4A is a similar holographic reconstruction setup as given by FIG. 2A; however, like FIGS. 3A and 3B, 4A represents the prior art. As clearly indicated by 103L, 131L, 132 and 133, the coherent beam is an un-modulated sine wave and 126L represents the point source in space; 129L is the holographic recording; 128L is a recording pixel; and 127L is the solution or reconstruction point.

FIG. 4B is a side view projection of FIG. 4A and where the entire coherent wavefront is seen. All the R numbers correspond in like kind with the L numbers of FIG. 4A, i.e., with the exception of 132 and 133, which are automatically implied.

Figure 5:
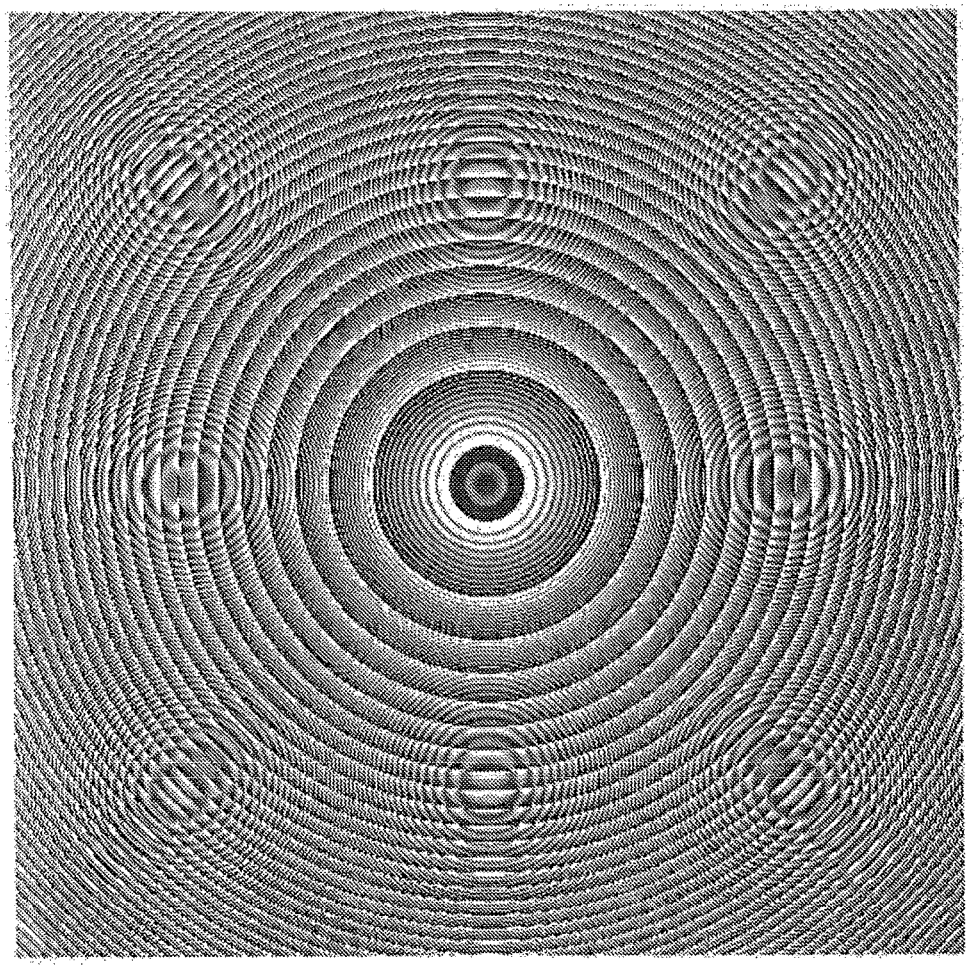
FIG. 5 illustrates a holographic recording produced in accordance with example embodiments of the present invention described herein.

FIG. 5 shows a holographic recording as made according to example embodiments described herein. Note that the recording shown is a plate, i.e., planar form of recording. However, there is no limit as to what manner or shape the recording pixels may take in terms of area and/or volume. Indeed, point clouds may be used. As such, any specific reference or illustration of form taken in the recording of a holograph made in accordance with example embodiments described herein is for illustrative purpose only and should not limit or otherwise narrow the scope of the present invention unless otherwise specifically claimed. Further, FIG. 5 corresponds to the recording in FIGS. 1A, 1B, 2A and 2B.

Figure 6:
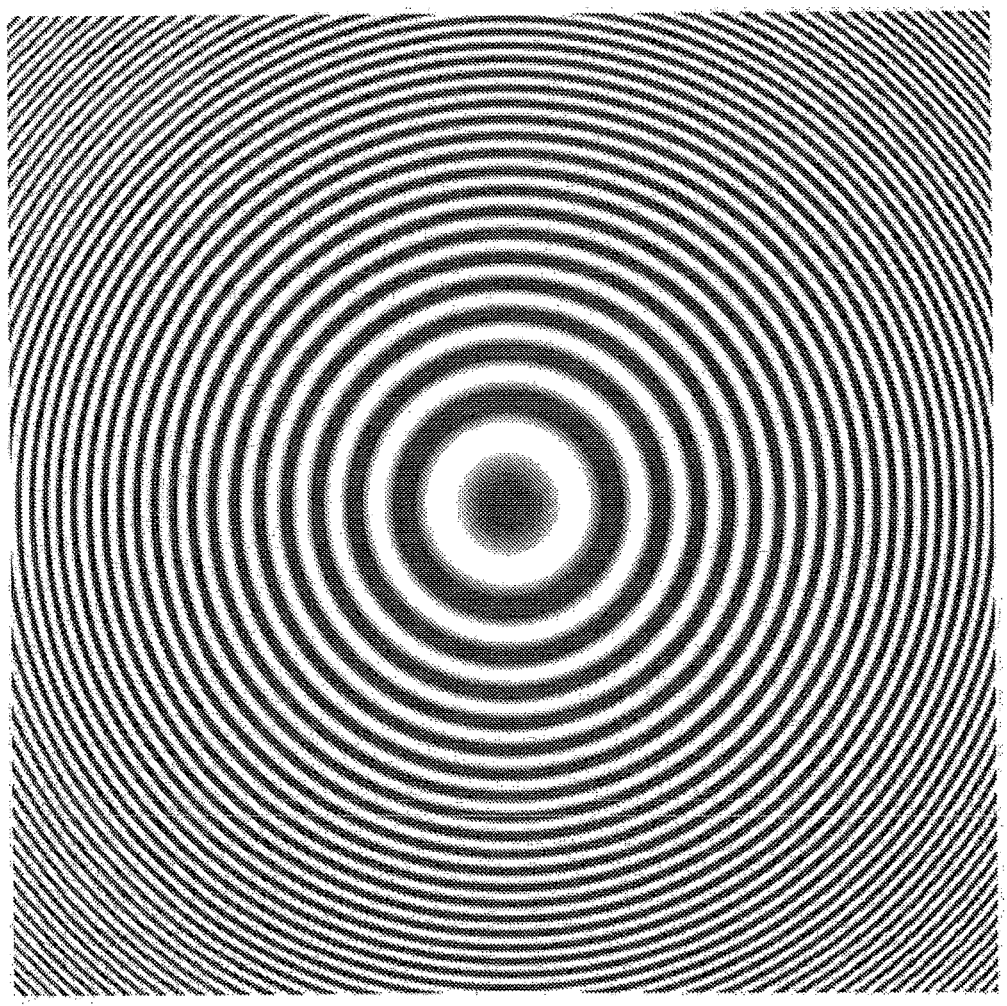
FIG. 6 shows a prior art holographic recording.

FIG. 6 illustrates a holographic recording as made by the prior art. Further, FIG. 6 corresponds to the recording in FIGS. 3A, 3B, 4A and 4B.

Figure 7:
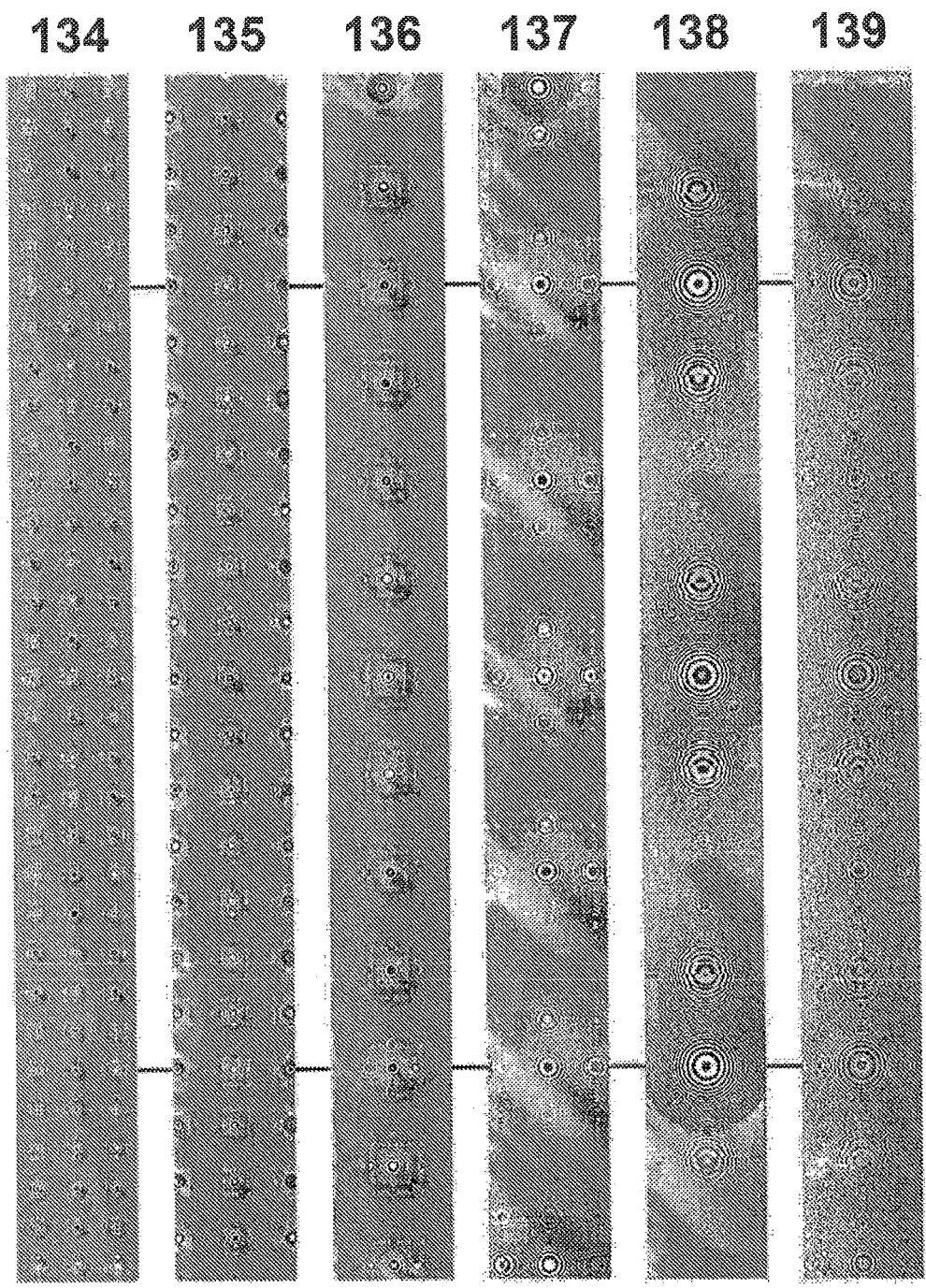
FIG. 7 illustrates the holographic recording of FIG. 5 when expanded into a series of larger, somewhat rectangular, recording plates in accordance with example embodiments of the present invention described herein.
Figure 8:
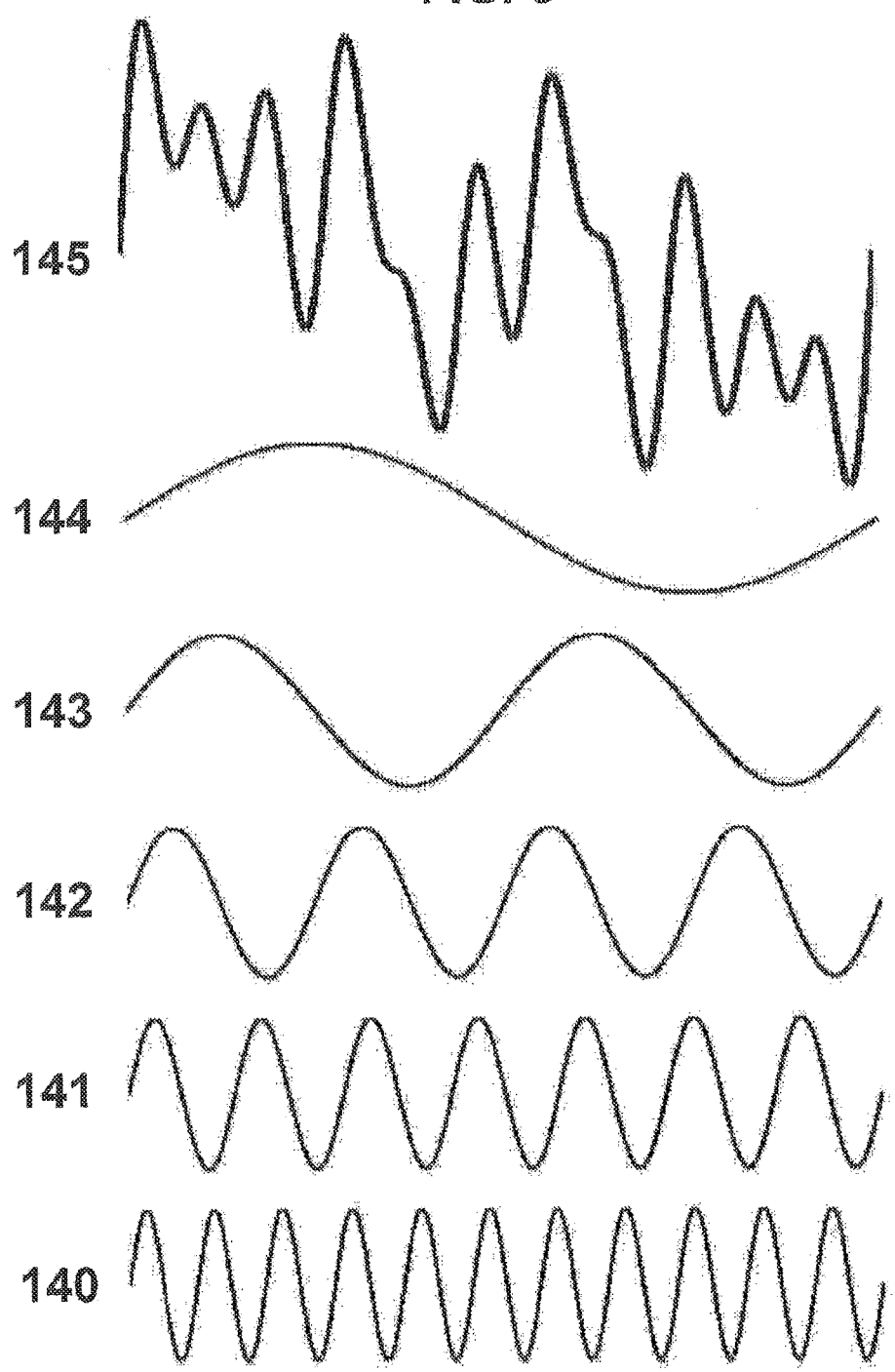
FIG. 8 illustrates the complex waveform including a fundamental wave and numerous harmonics therein in accordance with example embodiments of the present invention described herein.

FIGS. 7 and 8 correspond to each other. FIG. 7 shows what the holographic recording of FIG. 5 might look like if expanded into a larger, somewhat rectangular, recording plate. As shown, 139 illustrates the actual recording that may be made using the coherent beam embedded or modulated by the complex waveform and 134, 135, 136, 137, 138 show holographic recordings made separately by each of the individual spectral harmonic components 140, 141, 142, 143 and 144, respectively. Note that if 139 is closely examined, it is seen that all the spectral components of 134-140, 135-141, 136-142, 137-143 and 138-144 are contained within it and 145, of course, is the complex waveform that yields 139 when embedded into or modulated with fundamental 144.

Figure 9:
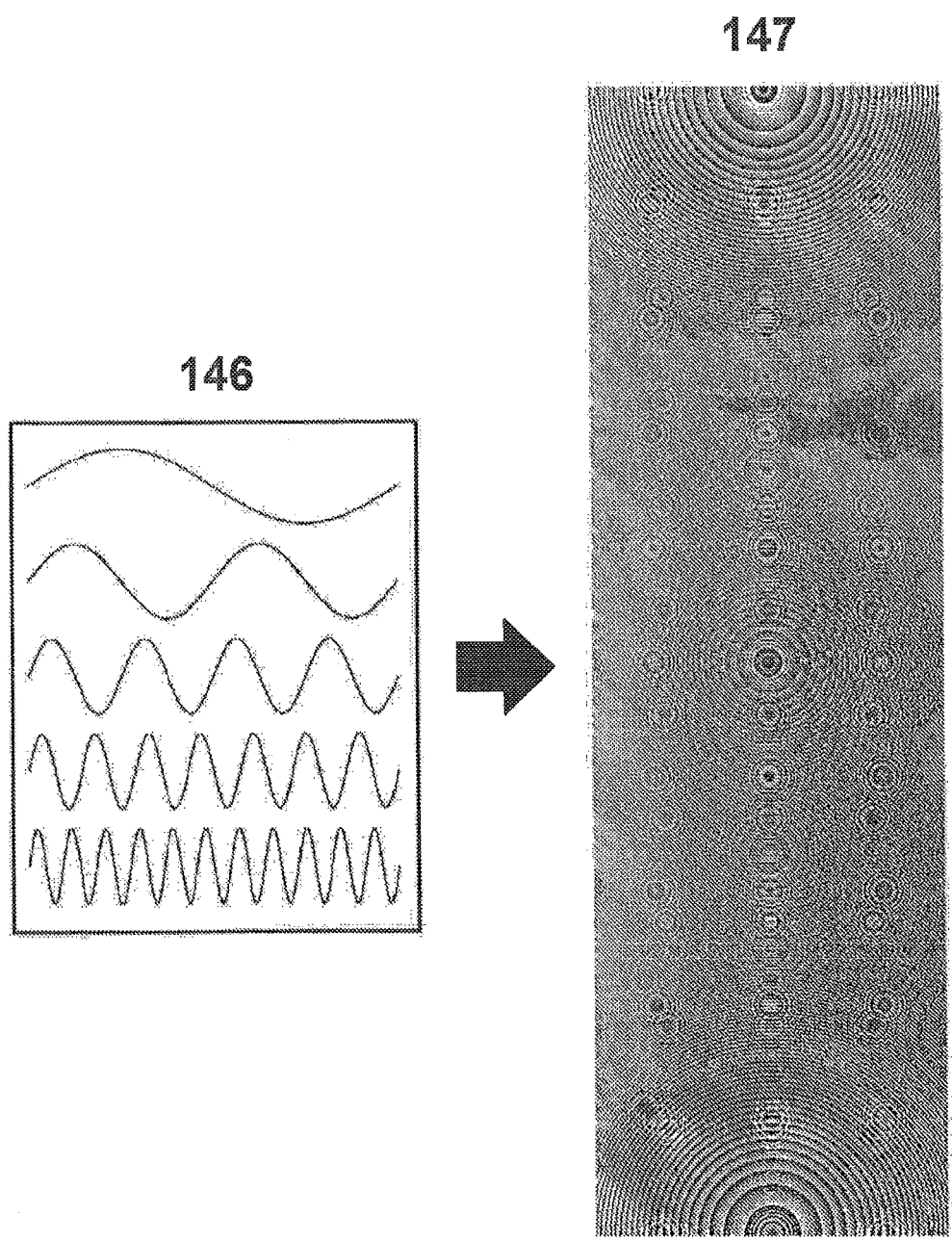
FIGS. 9 and 10 illustrate an expanded holographic recording similar to that of FIG. 5 and in accordance with example embodiments of the present invention described herein.
Figure 10:
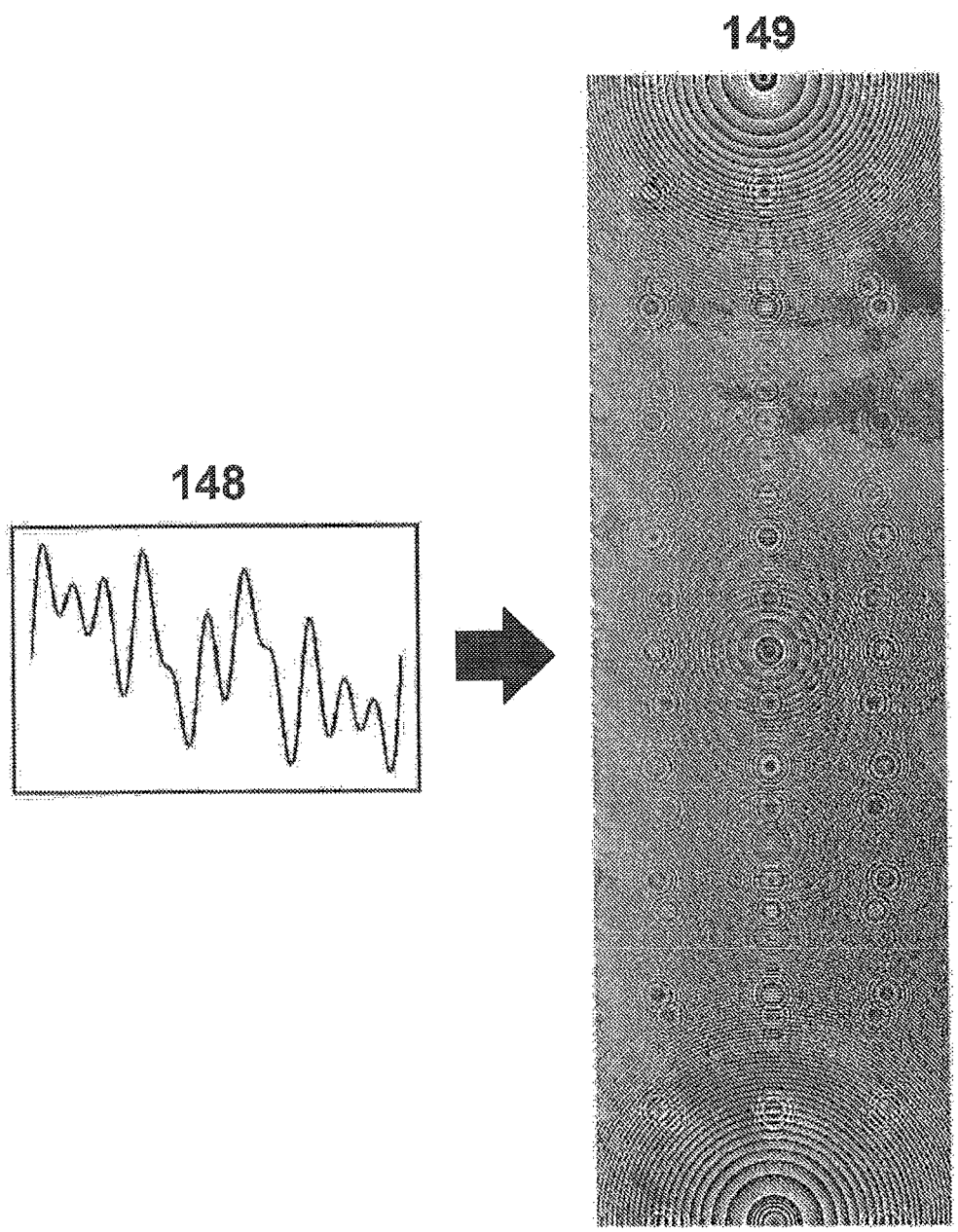

FIG. 9 (and the related FIG. 10) show a similar holographic recording as that of FIG. 5, but expanded. As illustrated, 147 is the recording as generated by a superposition of all the individual recordings made by the fundamental and harmonics shown in 146 and 149 is the recording made by merely the complex waveform 148, which is embedded into or modulated with the fundamental. When 147 and 149 are compared, we see that there is little difference. In other words, all the spectral harmonics are present, and all of these frequencies contribute to the phantom glow of the recognition or solution point, which is the original object point reconstructed.

Figure 11:
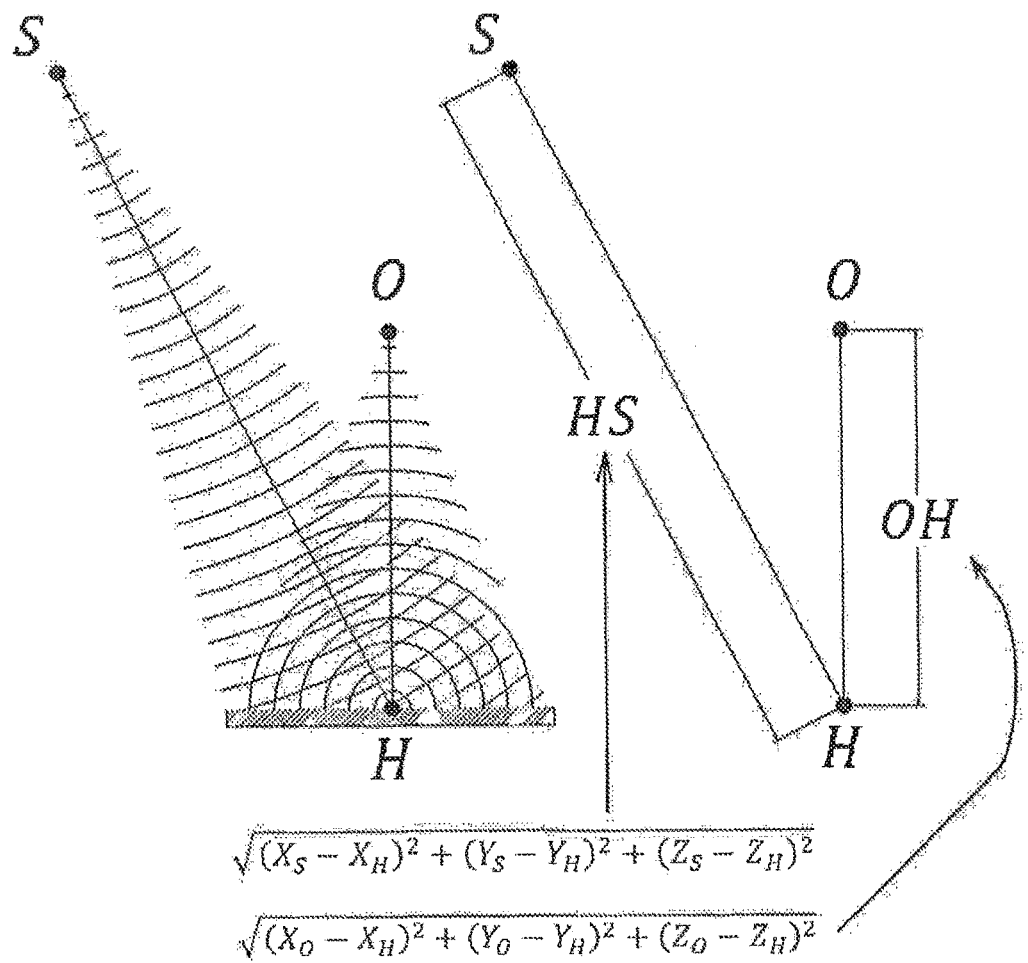
FIG. 11 illustrates a recording procedure similar to FIGS. 1B and 3B.

FIG. 11 shows two diagrams of the RECORDING process which are similar to FIG. 1B and 3B. As illustrated, the recording beam for a specific ray and the formulae used to calculate the ray, which is similar to a ray trace but referred herein as phase tracing. The Pythagorean Theorem is used for X, Y and Z components, although holograms of even higher dimensions can be used by the invention. Subsequently, the two Phase Components are calculated. In the recording process only two rays and Phase Components need to be calculated but, more are possible and contemplated within the scope of the invention. As such, any specific number of ray and phase components processed and recorded are used herein for illustrative purposes only as is not meant to limit or otherwise narrow the scope of the present invention unless otherwise claimed.

Figure 12:
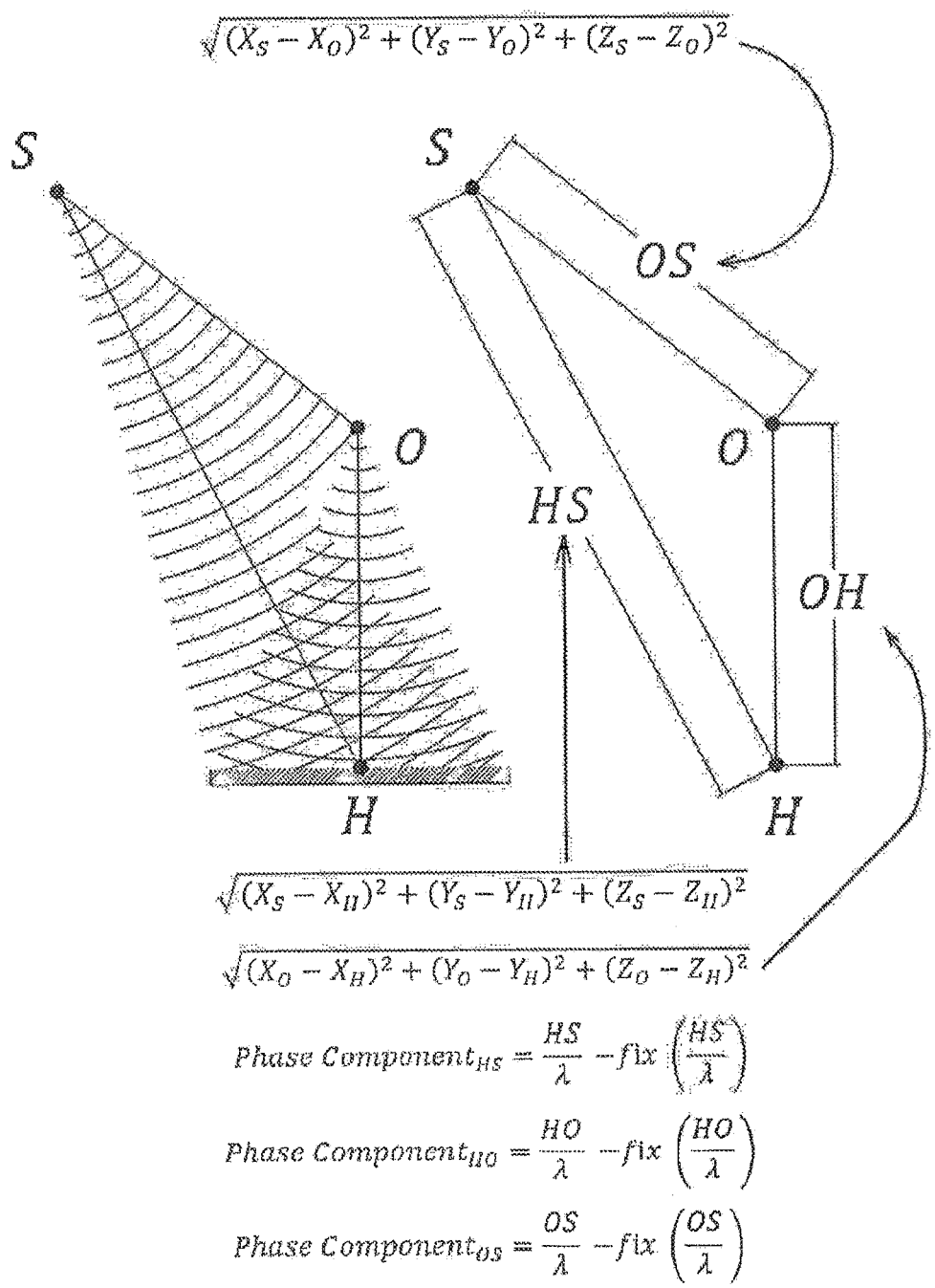
FIG. 12 illustrates a reconstruction procedure similar to FIGS. 2B and 4B.

FIG. 12 shows two diagrams of the RECONSTRUCTION embodiments, which are similar to FIGS. 2B and 4B. As shown, the recording beam for a specific ray and the formulae used to calculate the ray, which is similar to a ray trace but referred herein as phase tracing. Similar to the recording, the Pythagorean Theorem is used for X, Y and Z components, although holograms of even higher dimensions can be used by the invention. Subsequently, the Phase Components are calculated. In the reconstruction process at least three rays and Phase Components need to be calculated.

Figure 13:
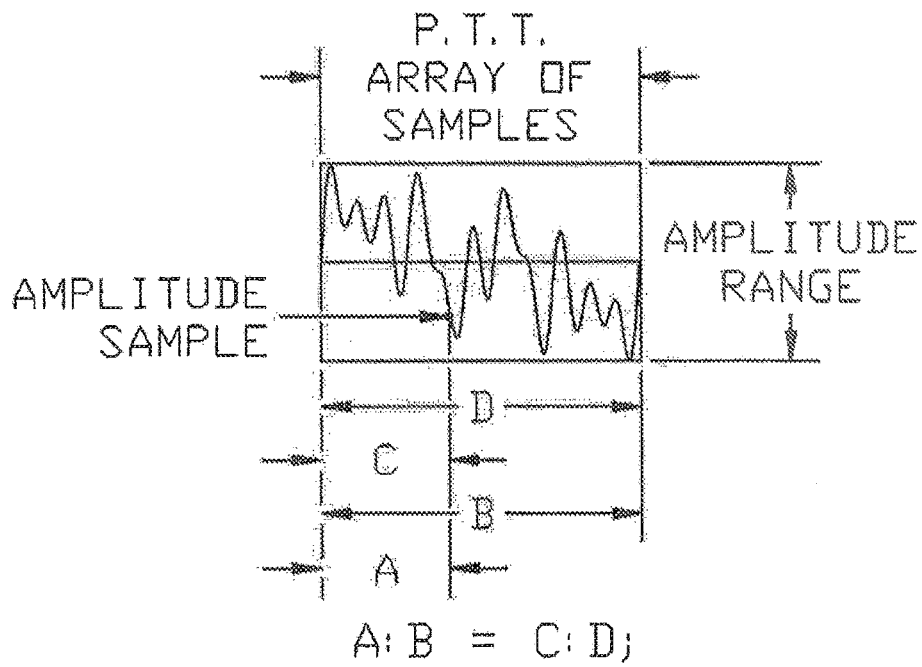
FIG. 13 illustrates modulating or embedding the complex waveform into a fundamental or carrier wave in accordance with example embodiments of the present invention described herein.

FIG. 13 shows modulating or embedding the complex waveform into the fundamental or carrier according to example embodiments described herein. In terms of mathematics, it is essentially achieved by a ratio and proportion operation: A is to B as C is to D.

Figure 14:
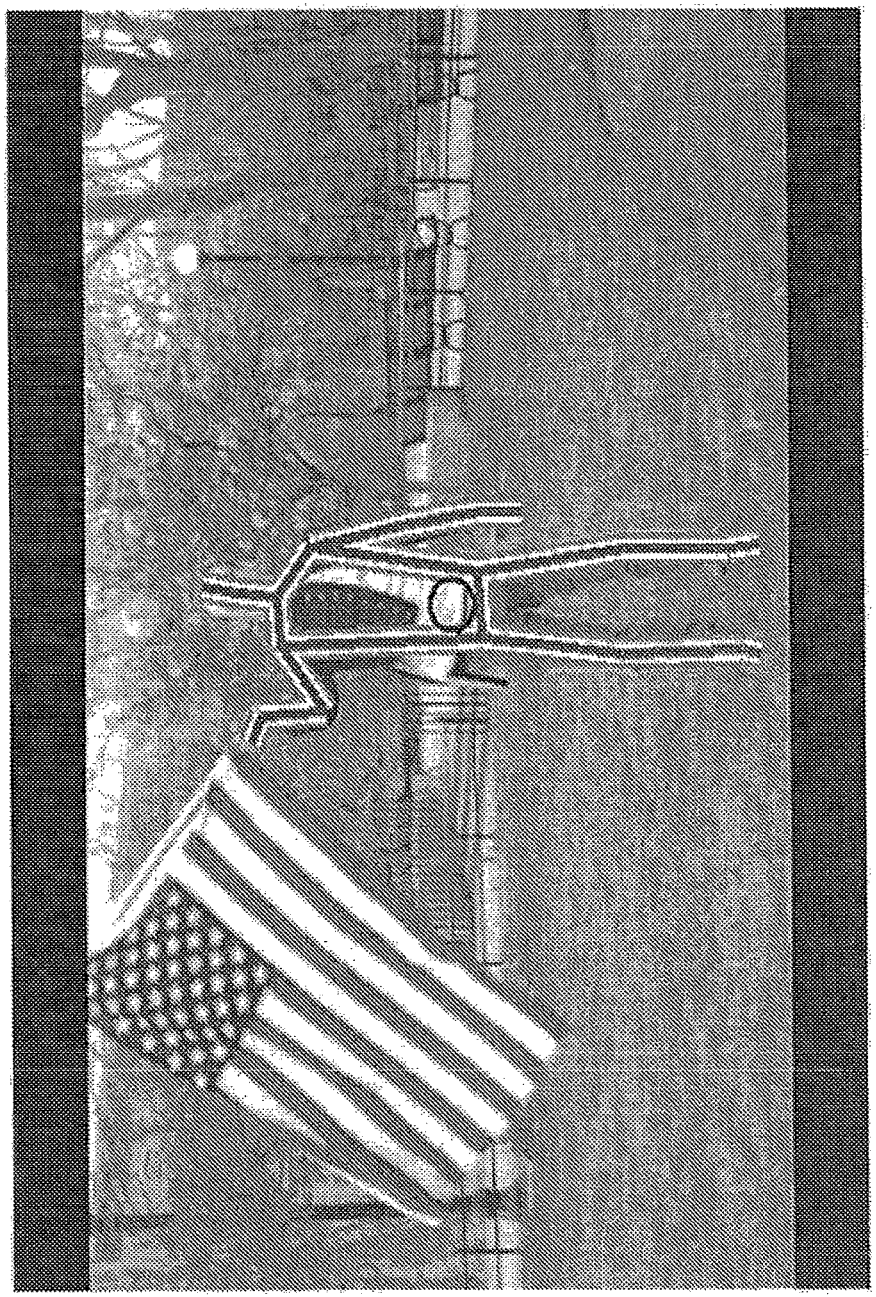
FIG. 14 illustrates the use of a centroid achieved by a derivative of the filtering process in accordance with example embodiments of the present invention described herein.

FIG. 14 illustrates a visual frame of a man carrying an American Flag as he wanders about a public park, patriotically dressed as George Washington. The Black Circle shown in the center of his person is a centroid achieved by a derivative of the filtering process described herein, whereby a waveform is captured by means of sensory intelligence. The Black Circle vibrates in two dimensions—X and Y. Therefore, the local vibration of this Black Circle at each frame of the video from which it was taken represents two samples of two waveforms: an X sample and a Y sample of an X waveform and a Y waveform. The auxiliary dots or recognition points of the man's arms, legs and head are translations from a trained database after the waveforms were: (1) collected from an initial vibrational filtering analysis of the video; (2) embedded into coherent reference beams which were used to reconstruct object points using pre-trained holograms; and (3) after the reconstructed object points were sampled and compared with the trained database.

Figure 15:
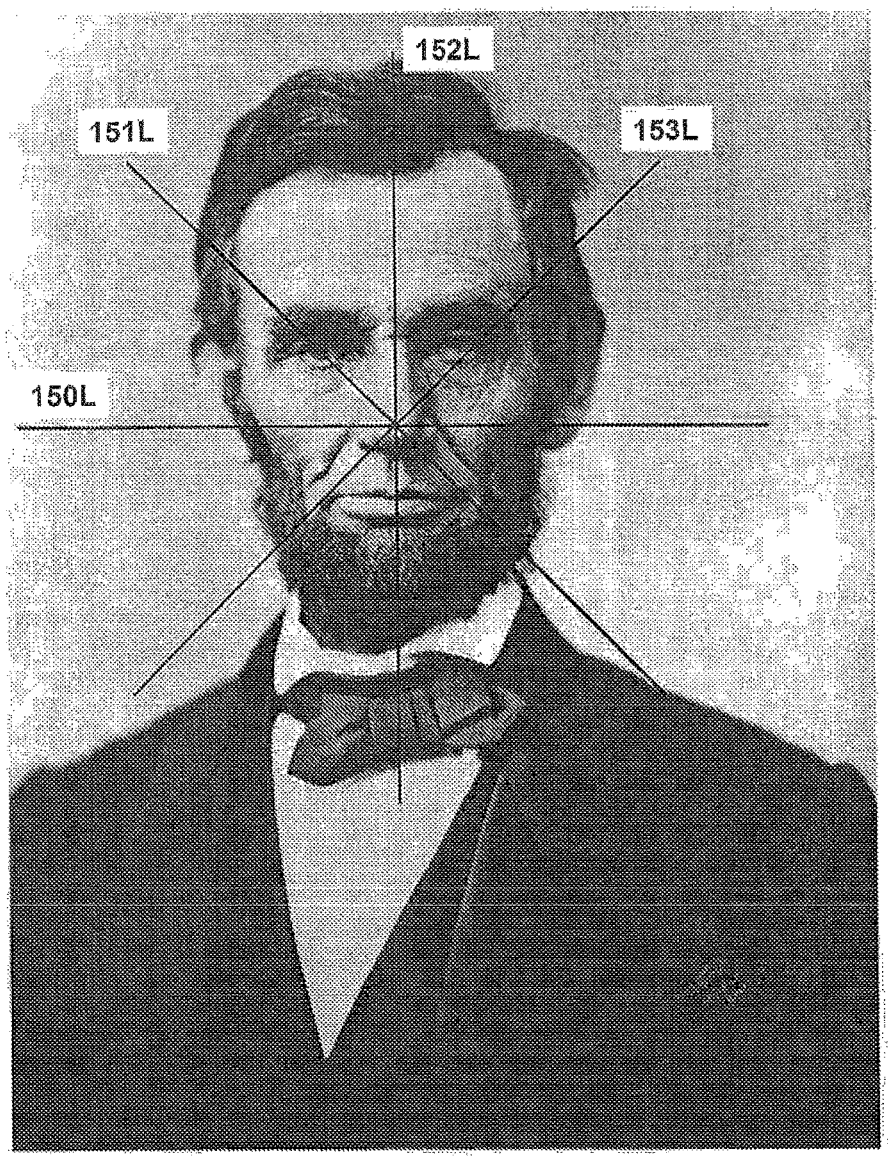
FIG. 15 illustrates a scanning procedure via pixel slices at varying angles and about a common centroid of overlap in accordance with example embodiments of the present invention described herein.

FIG. 15 shows a photograph of President Abraham Lincoln. The asterisk-like structure in the center of his face represents a scanning function of the invention whereby pixel slices at varying angles and about a common centroid of overlap are taken—four in all: 150L, 151L, 152L and 153L. Note that example embodiments described herein contemplate that many other slices of the photo may be used, and not only in the asterisk-type formation and/or only a portion of the slices need be used. As such, any number of slices, configuration, amount, shape, etc. is shown herein for illustrative purposes only and is not meant to limit or otherwise narrow the scope of the present invention unless otherwise explicitly claimed.

Next, the pixel slices are converted into complex waveforms, and a hologram is taken of each of the waveforms in accordance with example embodiments described herein: (i) en masse squeezed into the fundamental of the coherent reference beam used; (ii) in a repeatable feeded sequence within successive wavelengths of the coherent reference beam used; and/or (iii) as each waveform holographed one at a time, and the resulting four holograms superimposed into one.

Figure 16:
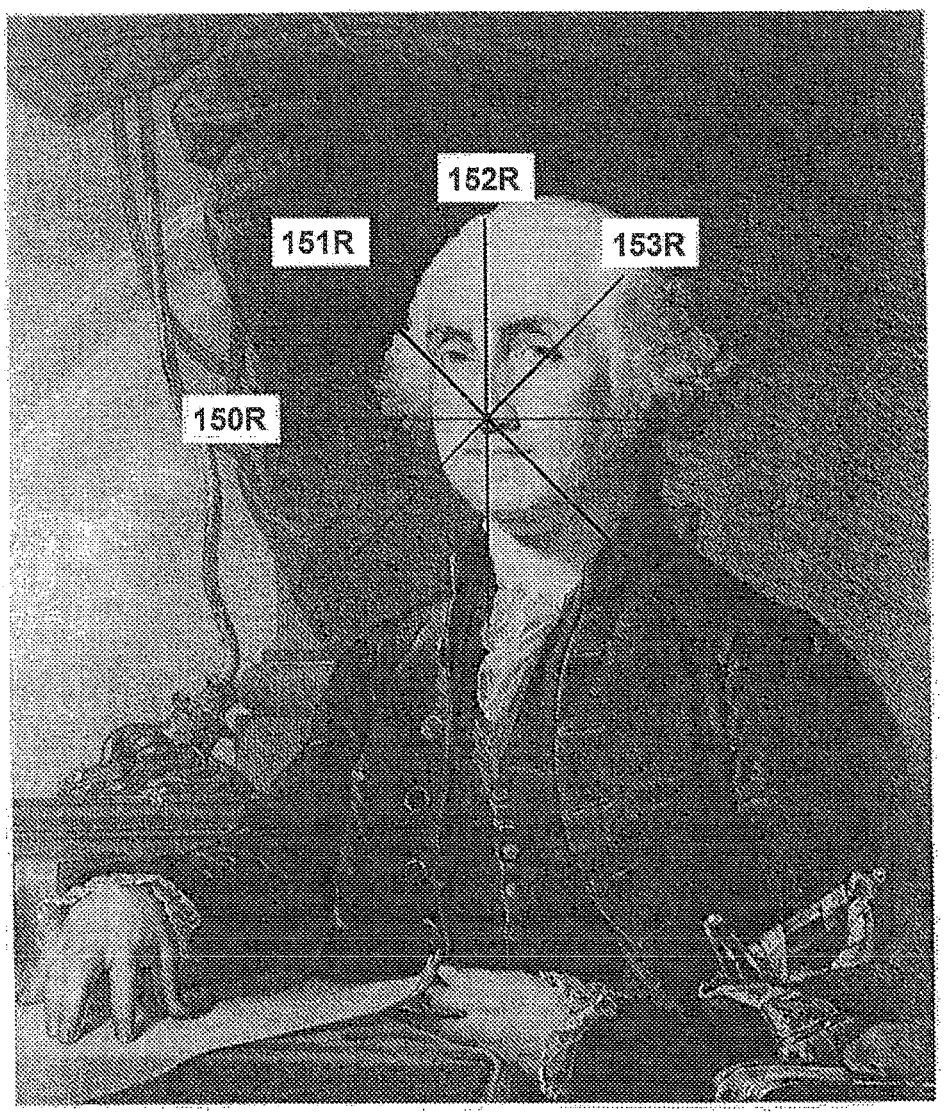
FIG. 16 a scanning procedure via pixel slices similar to FIG. 15, but using a different picture, in accordance with example embodiments of the present invention described herein.

FIG. 16 is similarly situated to FIG. 15, but is of President George Washington, with similar cross-sectional waveform scans 150R, 151R, 152R, 153 R, respectively. The figure is for practical illustration of course, and we must overlook that President Washington's face is slightly askew at an angle whereas Lincoln's glance is directly forward; and indeed it would be in best practice that it be direct forward also. Also, for practical illustration purposes we must overlook the relative size of the asterisk-configured pixel-slice scanning field for the waveform collection with respect to FIG. 15 of Lincoln. In the best-case scenario, the size of the respective scan fields of the objects being differentiated should be closely matched within practicality.

Figure 17:
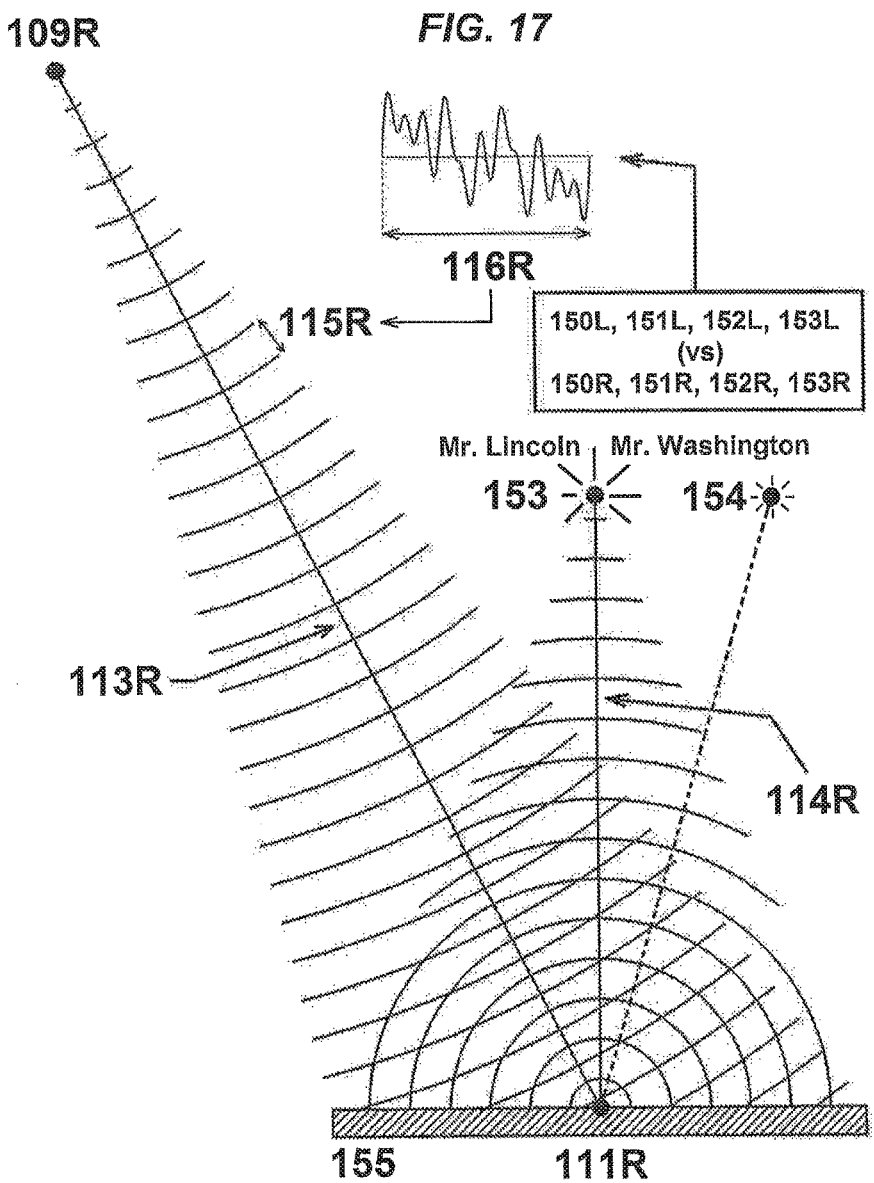
FIG. 17 shows two reconstructed singularity phantoms to illustrate the differentiation between two objects in accordance with example embodiments of the present invention described herein.

FIG. 17 shows two reconstructed singularity phantoms within the scope of the invention to illustrate the differentiation between two objects, in this case presidential photographs, or faces. As shown, 153 represents the spatial position of the recognition potential of the Lincoln photo of FIGS. 15 and 154 represents the same of what is understand as photo of President George Washington. Also, 155 represents a superimposed hologram wherein two separate holograms, one each of Lincoln and of Washington—each in and of themselves being a superimposed complex waveform holograms of each photo respectively as described in FIG. 15—have been superimposed. If we are given to understand that the reconstructing reference beam—not shown for clarity sake—is modulated by the Lincoln pixel-slice waveforms, 150L through 153L; and that the reference beam bombards the hologram; and the phantoms of Lincoln and Washington sampled for reconstruction intensity and said intensity accumulated on each pass, then the figure demonstrates that the accumulated intensity of the of the Lincoln photo phantom singularity achieves a brighter glow than that of the Washington phantom singularity. If the reference beam used is modulated, rather, with the understood-to-exist Washington photo pixel-slice waveforms, then the opposite would prove true.

Figure 18:
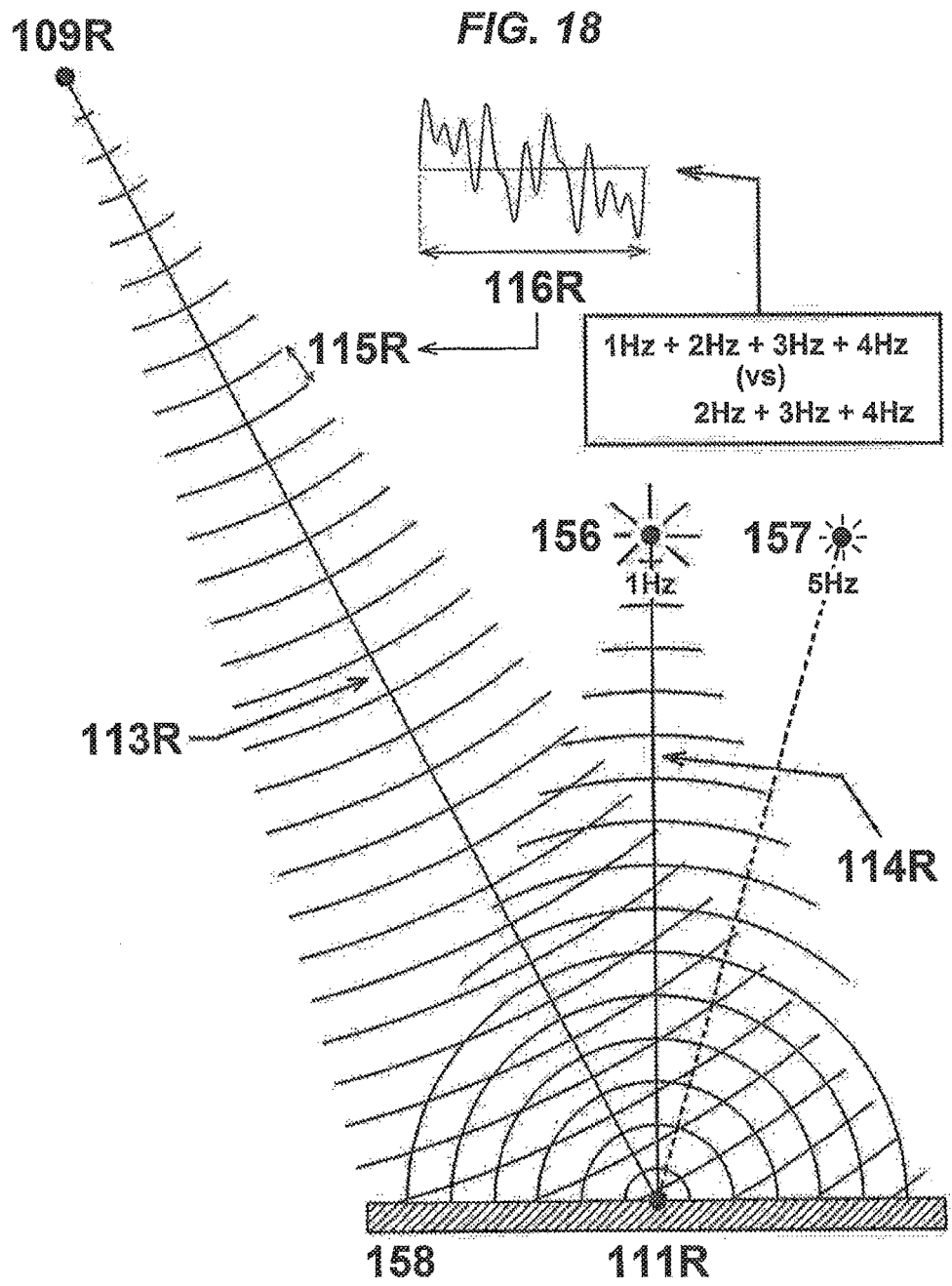
FIG. 18 shows a differential similar to FIG. 17 except that instead of photographs being identified with the phantom singularities, two harmonics are compared in accordance with example embodiments of the present invention described herein.

FIG. 18 shows a similar diagram to FIG. 17, only that instead of photographs being the identified with the phantom singularities, two harmonics are compared: 156 and 157 respectively, with 158 being the superimposed hologram or the individual un-superimposed holograms involved. By thus holographing additional harmonics as additional singularity objects in different spatial positions, by superimposing the holograms thus generated, and by then later reconstructing their phantoms using said complex-waveform embedded coherent beams, the patterns of the reconstructed phantom points provide the basis for an infinite variety of interesting spectrum plots in n-dimensional space.

Figure 19:
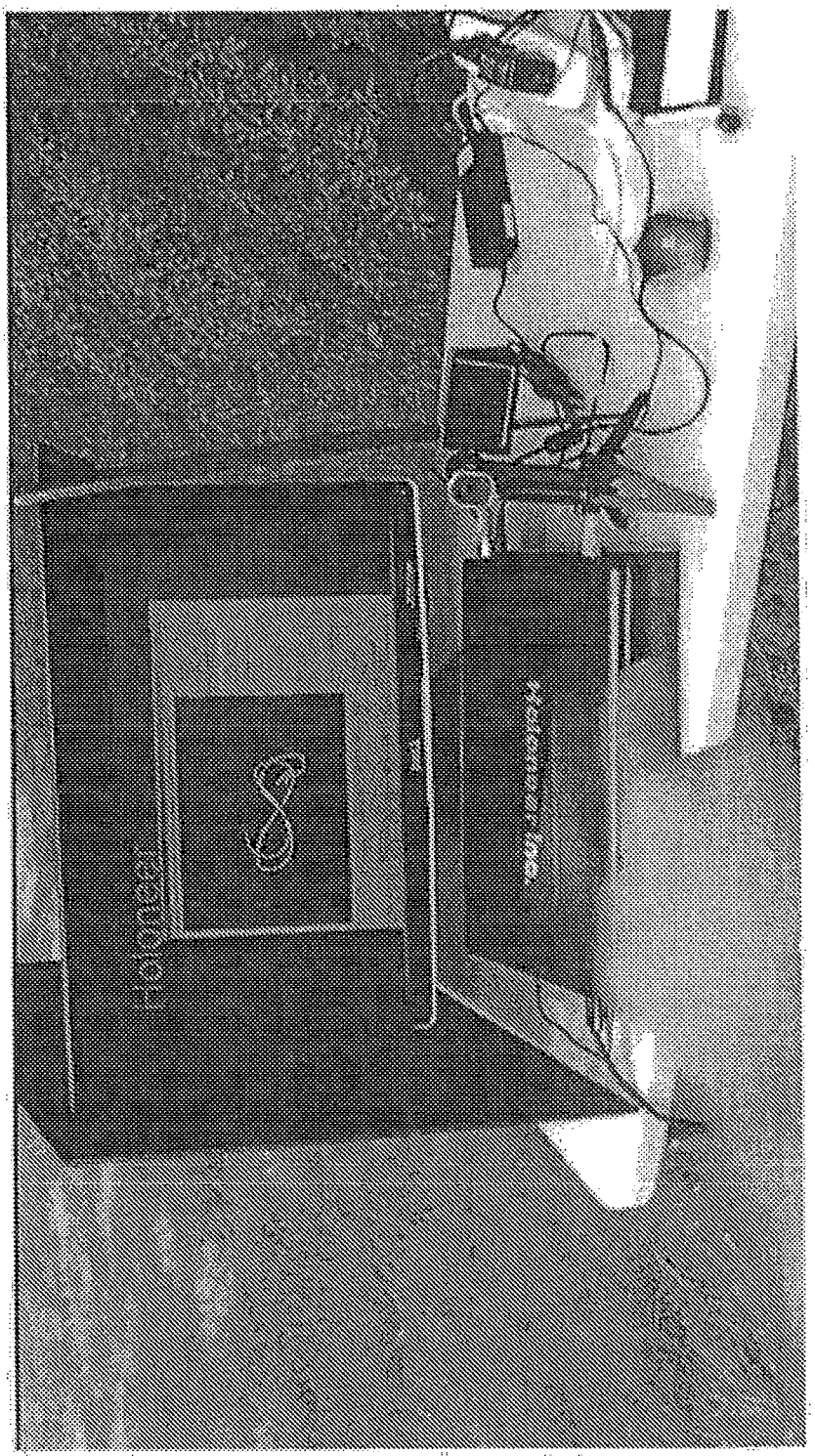
FIG. 19 illustrates a screen shot of a video where the progressive samples of the horizontal and vertical waveforms extracted by a differential analysis in accordance with example embodiments of the present invention.

FIG. 19 shows a screen shot of a video where the progressive samples of the horizontal and vertical waveforms extracted by one of the differential analysis techniques described herein are applied as X, Y coordinate pairs to move the stroke of a pixel brush on screen, without any artifice of scanner other than a simple video camera.

Figure 20:
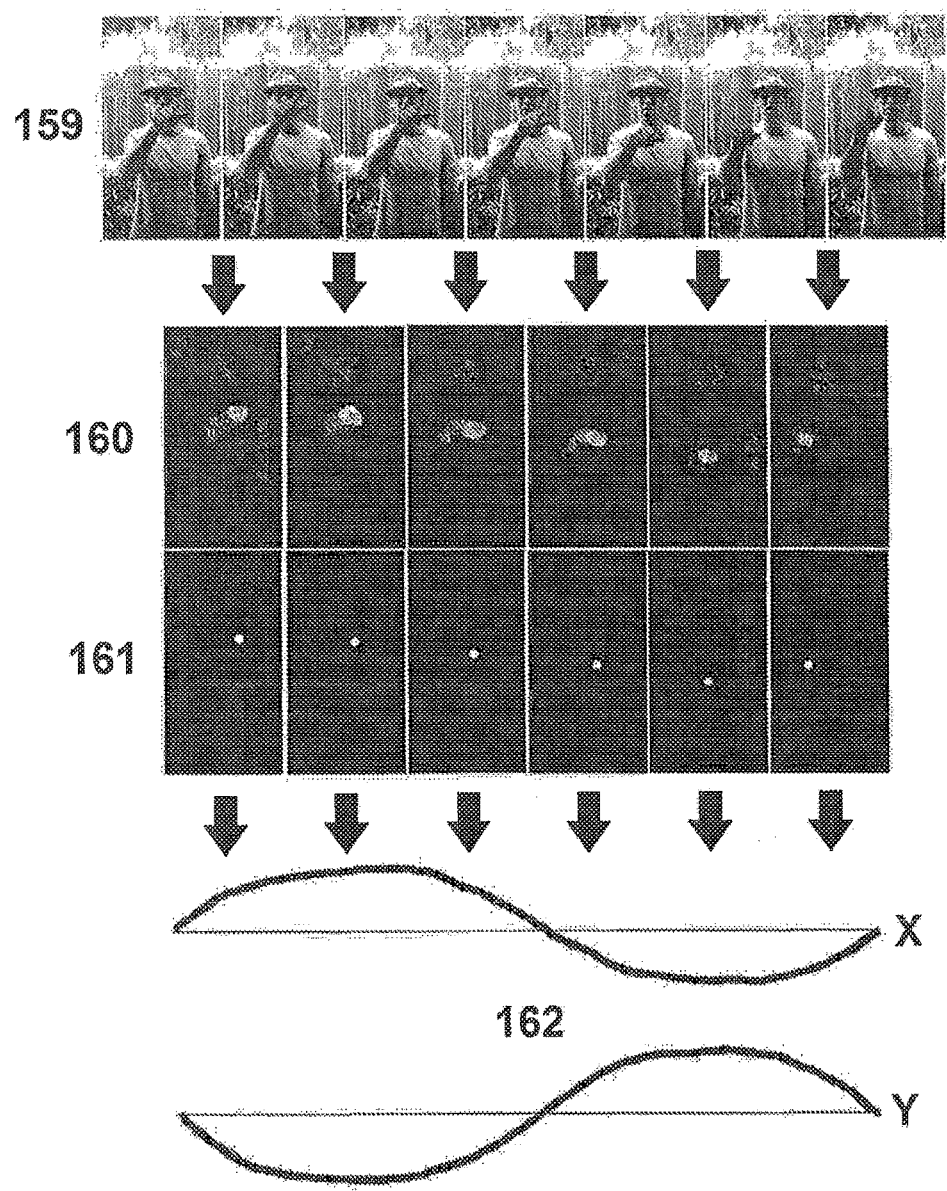
FIG. 20 illustrates an example of motion differentials of pixels coordinates and strengths for averaging into concentrated centroids or groups of concentrated centroids in accordance with example embodiments of the present invention described herein.

FIG. 20 shows a stream of seven still images or video frames; 159, constituting a short motion picture of a man performing a motion with his right arm, and hand altogether moving in free space such that his right index finger sweeps out a circular motion gesture. Using one of the embodiments described herein, the frames are analyzed for pixel changes between successive pairs and the pixel differentials, essentially motion differentials are generated and stored, 160. Subsequently, the differential pixels coordinates as well as their differential strengths are averaged into concentrated centroids or groups of concentrated centroids, 161. Then, the centroids are collected and run through the filtering processes mentioned herein so that they are smoothed out considerably from their raw state and in that same process are thus conjoined into waveforms, an X plot and a Y plot, respectively, 162. From here the waveforms are either stored or immediate applied for use by embedding or otherwise modulating the waveforms into coherent beams for frequency domain analysis by the holographic principles of example embodiments described herein. As well, they may also be applied as the steering yoke signals to guide a cursor or any other form of gesture recognition use.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

At least a complex waveform, at least an apparatus which embeds or otherwise modulates the waveform into a coherent beam, at least an object to be holographed which is positioned in space, at least a holographic recording medium, at least an apparatus used for recording and reconstructing holograms including at least a beamsplitter for splitting the coherent beam into an object and reference beam, and at least a means of sampling the reconstruction space for detecting relative strength of the object recorded and reconstructed with respect to other similar objects recorded and reconstructed.

Modulating a coherent beam with a complex waveform or of otherwise embedding a complex waveform within said coherent beam by the method and/or process described in the invention which is for the ultimate purpose of using said coherent beam as a novel reference source to make holograms of an object which can includes an n-dimensional spatial point or singularity which is illuminated by said coherent beam where the actual process of making the hologram put aside that the coherent beam has unconventionally novel properties is similar to conventional on or off-axis, interference-based holography known to those skilled in the art. Any entities involved including the waveform-the coherent beam, the hologram and the object may each be either real or virtual.

An apparatus which includes at least a physical modulator which modulates a single coherent beam by the desired complex waveform applied by a physical or electronic means or alternatively applies a plurality of single coherent beams each of which is modulated respectively by a complex waveform pre-filtered for its fundamental and harmonics such that the amplitude strength of each respective harmonics so filtered is used in turn to modulate one of the said plurality of coherent beams In the latter embodiment, the plurality of coherent beams thus modulated are aligned along the same linear trajectory —or optical path —in step with a fundamental beam also modulated. Each beam of the plurality which represents any given harmonic is proportionately in step with the fundamental of the fundamental beam in same manner that the fundamental of the complex waveform is in step with and in proportionate juxtaposition with its respective harmonics. The apparatus also has the ability to sample the reconstruction space for relative intensity of the phantoms and comparing said intensities for the purposes of the invention described.

An apparatus which performs the process of the invention of recording and reconstructing holograms of objects by virtual means and of sampling the reconstruction space for relative intensity of the phantoms and comparing said intensities for the purposes of the invention described. In this respect the apparatus is comprised of software that embodies the method, and/or process and/or algorithms described in the invention in which said software is run on a computing device which has at least a CPU, a memory (RAM), and secondary storage media.

Superimposing a plurality of individual holograms made by the method and/or process of the invention such that the resulting composite hologram records by reason of the combined interference pattern, the plurality of the objects which were individually holographed. Such superimposing may be performed by any of the conventional superimposing techniques known to those skilled in the art.

The process of extracting waveforms from image streams, audio streams and other sensory streams as described herein for the purpose of making holograms of the waveforms by means of illuminating and recording objects in n-dimensional space and reconstructing said in n-dimensional spaces as frequency-domain based Identifiers by reason of the collectives strengths of said phantom singularities —object reconstructions —which are sampled.

Using the process of extracting horizontal and vertical waveforms from the differential method and process described in the invention and making holograms of objects illuminated by the waveforms which holograms are then superimposed into a composite hologram. The hologram is later reconstructed and the phantoms are sampled in order to detect and differentiate various information contained in the waveforms, including gestures.

Using the process of extracting horizontal and vertical waveforms from the differential method and/or process and/or algorithm described in the invention as a means in and of itself to direct the movement of a screen-oriented paintbrush or other cursor.

The following algorithm which RECORDS the hologram:
Step 1. Embed or otherwise modulate a coherent beam with a complex waveform so that the fundamental and harmonics of the complex waveform are proportionately adjusted to the size of the fundamental of the wavelength of the coherent beam, and use this modulated beam as the source of radiation.
Step 2. Split the complex-waveform-modulated coherent beam into at least two beams, an object beam and a reference beam.
Step 3. Place at least an object, which may be an n-dimensional spatial point within proximity of a holographic recording medium.
Step 4. Direct the complex-waveform-modulated coherent beam at the object.
Step 5. Direct the-complex-waveform-modulated coherent beam at the holographic recording medium.
Step 6. Allow the holographic recording medium to record the interference pattern generated by the interaction of rays created by Step 4 and Step 5.
Step 7. Repeat the procedure for any additional waveforms to be recorded. Here it is desirable that a different object, that is, a different spatial position of the object, be chosen for each waveform recorded so as to provide a means of differentiation by means of position.

The following algorithm which RECONSTRUCTS the hologram:
Step 1. Embed or otherwise modulate a coherent beam with a complex waveform so that the fundamental and harmonics of the complex waveform are proportionately adjusted to the size of the fundamental of the wavelength of the coherent beam, and use this modulated beam as the source of radiation.
Step 2. Direct the complex-waveform-modulated coherent beam at the holographic recording medium.
Step 3. Sample the n-dimensional spatial position where the original object was located with respect to the source and the holographic recording medium, so as to measure and record the collective intensity of ray-wave concentrations there. Alternatively, if the hologram being reconstructed is the composite result of the superimposure of several holograms, then sample all or a subset of the plurality of spatial positions where other objects were located during other any previous recording sessions which are implicit in the superimposed or composite hologram which is being reconstructed.
Step 4. Compare the measurements of the samplings of Step 3 to differentiate harmonics within the waveform currently modulating the reconstructing coherent beam. Alternatively, compare the present measurements of reconstruction with measurements from samplings using other complex waveforms in order to make frequency-domain based qualitative distinctions and comparisons of the waveforms. Alternatively, store the measurements as amplitude component information where the frequency or frequencies corresponding to the spatial point positions is already known, and use the amplitude component information to reverse the process and reconstitute the original, filtered or novel waveforms which are implied by that frequency-domain component information. This can be done by using a reverse FFT or reverse discrete FFT or by using appropriate electronic or other physical modulation hardware. For this purpose, the amplitude component information may be amplified or attenuated to a suitable level prior to reconstitution.

The following algorithm to sample a trajectory through the reconstruction space:

Step 1. Plot a trajectory path through the n-dimensional reconstruction space.

Step 2. Store the coordinates of the trajectory path thus plotted in Step 1:

Step 3. Perform the reconstruction method as given in paragraph 109.

Step 4. Sample every position in the reconstruction space as given by the coordinates of the trajectory path plotted in step 1.

Step 5. Use the samples for purposes as given by paragraph 109, Step 4.

What is claimed:

1. A method of using spectral components of one or more spatial cross sections of pixels of an image for recognizing a similar image, the method comprising:
   generating a first hologram of spectral characteristics of one or more spatial cross-sections of pixels of a first image;
   generating a second hologram of spectral characteristics of one or more spatial cross-sections of pixels of a second image;
   comparing the first hologram to the second hologram by:
   a) scanning the one or more spatial cross-sections of pixels of the first image to create first complex waveforms; and,
   b) using the first complex waveform to modulate a reference beam to interrogate the second hologram.

2. The method of claim 1,
   wherein the complex waveforms include a spatial envelope of the changing intensity of the contiguous, spatially situated pixels of the respective one or more cross-sections; and
   further comprising storing the complex waveforms for subsequent comparisons.

3. The method of claim 2, further comprising:
   normalizing each of the complex waveforms by filtering out a DC component therefrom.

4. The method of claim 3, wherein the DC component is calculated using at least one of:
   (i) an average intensity of pixels across a respective one or more cross-sections;
   (ii) an average intensity of pixels across all pixels of each of the one or more cross-sections for a respective image; or
   (iii) an average intensity of pixels across an entire respective image.

5. The method of claim 1, wherein a the first hologram is generated from sequentially scanned cross sections.

6. The method of claim 1, wherein the scanned cross sections are at varying angles overlapping at a centroid.

7. The method of claim 1, comprising scanning the one or more spatial cross-sections of pixels across the image at different angles.

8. The method of claim 1, further comprising using a photometer to quantitatively analyze the result of the interrogation, wherein a signal of greater brightness from the photometer indicates the first and second images are more similar.

9. A computer program product for use in differentiating spectral components of one or more spatial cross sections of pixels of an image for recognizing a similar image, the computer program product comprising:
   computer executable instructions stored on a non-transitory computer readable medium in such a way that when executed by a processor cause a general or special purpose computer configured to:
   generate a first hologram of spectral characteristics of one or more spatial cross-sections of pixels of a first image;
   generate a second hologram of spectral characteristics of one or more spatial cross-sections of pixels of a second image;
   scan the one or more spatial cross-sections of pixels of the first image to create a first complex waveform; and,
   use the first complex waveform to modulate a reference beam to interrogate the second hologram;
   and
   quantitatively analyze a result of the interrogation of the second hologram by the complex waveform.

10. The computer program product of claim 9, further comprising computer executable instructions that when executed by the processor cause the general purpose or special purpose computer to:
    scan the one or more spatial cross-sections of pixels of the first and second images in order to create complex waveforms thereof, wherein each of the complex waveforms include a spatial envelope of the changing intensity of the contiguous, spatially situated pixels of the respective one or more cross-sections; and
    store the complex waveforms for subsequent comparison.

11. The computer program product of claim 10, further comprising computer executable instructions that when executed by the processor cause the general purpose or special purpose computer to:
    normalize each of the complex waveforms by filtering out a DC component therefrom.

12. The computer program product of claim 11, wherein the DC component is calculated using at least one of:
    (i) an average intensity of pixels across a respective one or more cross-sections;
    (ii) an average intensity of pixels across all pixels of each of the one or more cross-sections for a respective image; or
    (iii) an average intensity of pixels across an entire respective image.

* * * * *